(12) United States Patent
Arafat et al.

(10) Patent No.: US 10,867,305 B2
(45) Date of Patent: Dec. 15, 2020

(54) REVIEW MANAGEMENT DEVICE, REVIEW MANAGEMENT METHOD, AND REVIEW MANAGEMENT PROGRAM

(71) Applicant: Rakuten, Inc., Tokyo (JP)

(72) Inventors: Roland Arafat, Shinagawa-ku (JP); Miwa Takemura, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 707 days.

(21) Appl. No.: 14/431,379

(22) PCT Filed: Jan. 23, 2014

(86) PCT No.: PCT/JP2014/051381
§ 371 (c)(1),
(2) Date: Mar. 26, 2015

(87) PCT Pub. No.: WO2014/148101
PCT Pub. Date: Sep. 25, 2014

(65) Prior Publication Data
US 2015/0278826 A1 Oct. 1, 2015

(30) Foreign Application Priority Data
Mar. 18, 2013 (JP) .................................. 2013-055218

(51) Int. Cl.
*G06Q 30/00* (2012.01)
*G06Q 30/02* (2012.01)

(52) U.S. Cl.
CPC ....... *G06Q 30/018* (2013.01); *G06Q 30/0282* (2013.01)

(58) Field of Classification Search
None
See application file for complete search history.

(56) References Cited

U.S. PATENT DOCUMENTS 8,386,336 B1 * 2/2013 Fox .................... G06Q 30/0253
705/26.1
8,504,486 B1 * 8/2013 Pinto .................. G06Q 30/0631
705/1.1
(Continued)

FOREIGN PATENT DOCUMENTS

CN 101151607 B * 11/2012 ............. G06Q 30/02
JP 2002-279305 A 9/2002
(Continued)

OTHER PUBLICATIONS

M. Arun Manicka Raja, Review Analyzer: Analyzing Consumer Product Reviews from Review Collections, Apr. 2012, 2012 International Conference on Recent Advances in Computing and Software Systems, pp. 1-6 (Year: 2012).*
(Continued)

*Primary Examiner* — Michael Young
(74) *Attorney, Agent, or Firm* — Sughrue Mion, PLLC

(57) ABSTRACT

A review management device according to one embodiment includes a specifying unit, a determination unit and a writing control unit. The specifying unit specifies an access user and a target product for a product review based on a request from a user terminal. The determination unit acquires a delivery status of products purchased by users on a web site and determines whether the access user has received the target product purchased on the web site. The writing control unit permits writing of a review on the target product by the access user after it is determined that the access user has received the target product, and restricts writing of a review on the target product by the access user when it is determined that the access user has not received the target product.

9 Claims, 28 Drawing Sheets

(56) References Cited

U.S. PATENT DOCUMENTS

| | | | |
|---|---|---|---|
| 2003/0105668 A1 | 6/2003 | Segawa et al. | |
| 2004/0153357 A1* | 8/2004 | De Sylva | G06Q 10/06315 705/7.25 |
| 2008/0071602 A1* | 3/2008 | Ojakaar | G06Q 30/02 705/14.44 |
| 2012/0221479 A1* | 8/2012 | Schneck, III | G06Q 30/0631 705/347 |

FOREIGN PATENT DOCUMENTS

| | | |
|---|---|---|
| JP | 2003-167990 A | 6/2003 |
| JP | 2006-27819 A | 2/2006 |
| JP | 2011-128840 A | 6/2011 |

OTHER PUBLICATIONS

Communication from the International Searching Authority dated Oct. 1, 2015 in PCT/JP2014/051381.
International Search Report dated Feb. 18, 2014 in a counterpart International Application No. PCT/JP2014/051381.

* cited by examiner

Fig.7

| USER ID | ORDER NUMBER | ORDER DATE AND TIME | PRODUCT ID | .... |
|---|---|---|---|---|
| U001 | C0001 | 2013/01/20 21:30:00 | P0010 | .... |
| | | | P1020 | .... |
| U002 | C0002 | 2013/01/21 15:10:00 | P0500 | .... |
| U003 | C0003 | 2013/01/21 22:00:00 | P1020 | .... |
| | | | P2030 | .... |
| | | | P2050 | .... |
| U001 | C0004 | 2013/02/01 23:30:00 | P0010 | .... |
| | | | P2020 | .... |
| U004 | C0005 | 2013/01/25 00:40:00 | P3010 | .... |
| ⋮ | ⋮ | ⋮ | ⋮ | ⋮ |

| ORDER NUMBER | PRODUCT ID | SHIPPING DATE AND TIME | RECEIVED DATE AND TIME | |
|---|---|---|---|---|
| C0001 | P0010 | 2013/01/22 10:30:00 | 2013/01/23 11:00:00 | .... |
| C0001 | P1020 | 2013/01/22 10:30:00 | 2013/01/23 11:00:00 | .... |
| C0002 | P0500 | 2013/01/23 09:30:00 | 2013/01/23 19:00:00 | .... |
| C0003 | P1020 | 2013/01/23 10:00:00 | 2013/01/24 20:00:00 | .... |
| C0003 | P2030 | 2013/01/23 20:00:00 | | .... |
| C0003 | P2050 | 2013/01/23 20:00:00 | | .... |
| C0004 | P0010 | | | .... |
| C0004 | P2020 | 2013/01/25 12:00:00 | 2013/01/26 09:00:00 | .... |
| C0005 | P3010 | | | .... |
| ... | ... | ... | ... | ... |

Fig.9

| SET ID | PRODUCT LIST |
|---|---|
| K0001 | P0010 , P0011 |
| K0002 | P1020 , P2050 |
| K0003 | P1020 , P2050 , P2060 |
| K0004 | P3010 , P3011 |
| ⋮ | ⋮ |

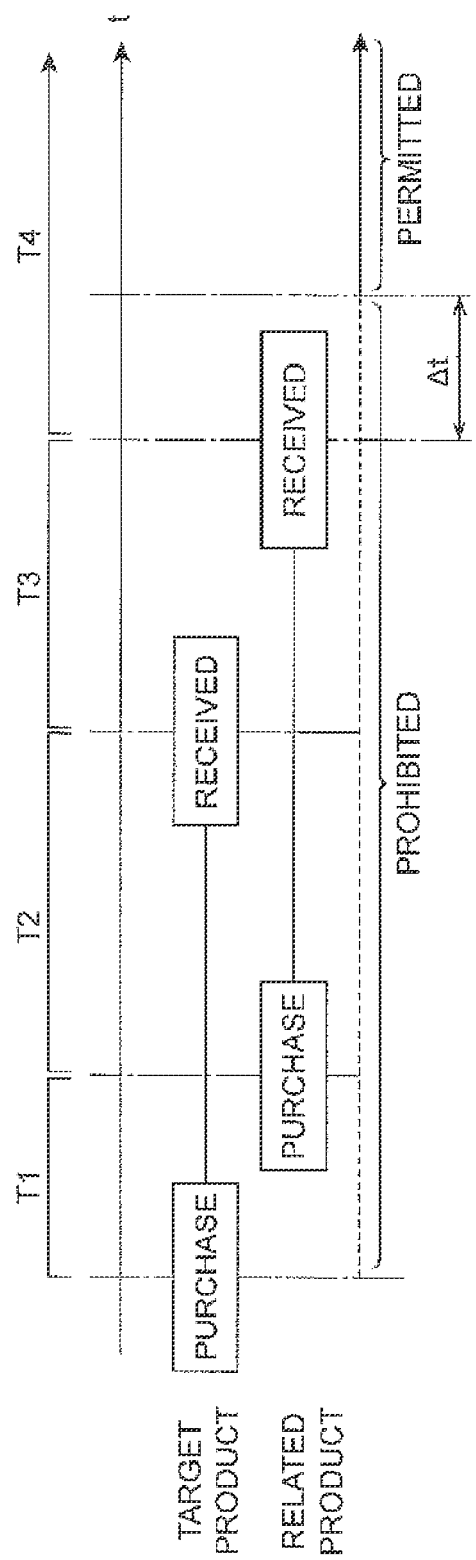

REVIEW MANAGEMENT DEVICE, REVIEW MANAGEMENT METHOD, AND REVIEW MANAGEMENT PROGRAM

CROSS REFERENCE TO RELATED APPLICATIONS

This application is a National Stage of International Application No. PCT/JP2014/051381 filed Jan. 23, 2014, claiming priority based on Japanese Patent Application No. 2013-055218 filed Mar. 18, 2013, the contents of all of which are incorporated herein by reference in their entirety.

TECHNICAL FIELD

One aspect of the present invention relates to a review management device, a review management method, and a review management program.

BACKGROUND ART

In many electronic commerce sites for general users, users can write reviews (product reviews) of purchased products. The written reviews are published, and other users can consider the reviews when determining whether or not to purchase a product. For example, Patent Literature 1 below discloses a product information collection system that includes an article posting unit that receives the posting of articles about products, an article storage and management unit that stores and manages the posted articles, an article/product link unit that associates information about a product with each article and generates a link to the information about the product, and an article display unit that displays articles.

CITATION LIST

Patent Literature

PTL 1: JP 2003-167990 A

SUMMARY OF INVENTION

Technical Problem

However, in the existing mechanism of product reviews, because users who have not yet received a purchased product can write reviews, the reviews based on guesswork are published, which degrades the reliability of product reviews. Thus, there is a need for a mechanism to further enhance the reliability of product reviews.

Solution to Problem

A review management device according to one aspect of the present invention includes a specifying unit configured to specify an access user and a target product for a product review based on a request from a user terminal, a determination unit configured to acquire a delivery status of products purchased by users on a web site and determine whether the access user has received the target product purchased on the web site, and a writing control unit configured to permit writing of a review on the target product by the access user after it is determined that the access user has received the target product, and restrict writing of a review on the target product by the access user when it is determined that the access user has not received the target product.

A review management method according to one aspect of the present invention is a review management method performed by a review management device, the method including a specifying step of specifying an access user and a target product for a product review based on a request from a user terminal, a determination step of acquiring a delivery status of products purchased by users on a web site and determining whether the access user has received the target product purchased on the web site, and a writing control step of permitting writing of a review on the target product by the access user after it is determined that the access user has received the target product, and restricting writing of a review on the target product by the access user when it is determined that the access user has not received the target product.

A review management program according to one aspect of the present invention causes a computer to implement a specifying unit to specify an access user and a target product for a product review based on a request from a user terminal, a determination unit to acquire a delivery status of products purchased by users on a web site and determine whether the access user has received the target product purchased on the web site, and a writing control unit to permit writing of a review on the target product by the access user after it is determined that the access user has received the target product, and restrict writing of a review on the target product by the access user when it is determined that the access user has not received the target product.

A computer-readable recording medium according to one aspect of the present invention stores a review management program that causes a computer to implement a specifying unit to specify an access user and a target product for a product review based on a request from a user terminal, a determination unit to acquire a delivery status of products purchased by users on a web site and determine whether the access user has received the target product purchased on the web site, and a writing control unit to permit writing of a review on the target product by the access user after it is determined that the access user has received the target product, and restrict writing of a review on the target product by the access user when it is determined that the access user has not received the target product.

According to the above aspects, whether the access user who may write a review of a purchased product (target product) has actually received the product is determined based on the delivery status, and the writing of a review is permitted only after it is determined that the product has been received. In this manner, by permitting the writing of a review only for the user who has received the purchased product, the probability that the user writes comments after actually using the product increases, and it is thereby possible to further enhance the reliability of product reviews.

In a review management device according to another aspect, the determination unit may acquire the delivery status and set product information indicating a combination of products, specify a related product combined with the target product and purchased by the access user concurrently with the target product, and determine whether the access user has received both of the target product and the related product, and the writing control unit may permit the writing after it is determined that the access user has received both of the target product and the related product, and restrict the writing when it is determined that the access user has not received at least one of the target product and the related product.

In a review management device according to another aspect, when the related product purchased concurrently with the target product does not exist, the determination unit may determine whether the access user has received the target product, and the writing control unit may permit the writing after it is determined that the access user has received the target product, and restrict the writing when it is determined that the access user has not received the target product.

In a review management device according to another aspect, the determination unit may determine whether the access user has purchased and received the target product in the past before the access user has purchased the target product last time, and when it is determined that the access user has received the target product in the past, the writing control unit may permit the writing regardless of whether the access user has received the target product.

In a review management device according to another aspect, the determination unit may determine whether a specified period of time has elapsed after the access user has received the target product, and the writing control unit may permit the writing when it is determined that the specified period of time has elapsed, and restrict the writing when it is determined that the specified period of time has not elapsed.

In a review management device according to another aspect, the determination unit may determine whether the access user has received the target product and whether a specified period of time has elapsed after the access user has received the target product, and when it is determined that the access user has received the target product, the writing control unit may ease restriction on the writing than when it is determined that the access user has not received the target product, and when it is determined that the specified period of time has elapsed, the writing control unit may ease restriction on the writing than when it is determined that the access user has received the target product.

In a review management device according to another aspect, the determination unit may determine whether a specified period of time has elapsed after the access user has received both of the target product and the related product, and permit the writing when it is determined that the specified period of time has elapsed, and restrict the writing when it is determined that the specified period of time has not elapsed.

A review management device according to another aspect may further include a notification unit configured to, when permitting writing restricted by the writing control unit, notify the access user of the permission, and when the writing control unit restricts writing on the target product by the access user, the writing control unit stores restriction information in which the access user and the target product are associated into a storage unit, and the notification unit may perform the same processing as the determination unit, and notify the access user that the restricted writing is permitted to the access user after it is determined that the access user has received the target product.

In a review management device according to another aspect, the determination unit may estimate the delivery status based on information in which a place of shipping and a place of receiving a product and an estimated delivery period are associated.

Advantageous Effects of Invention

According to one aspect of the present invention, it is possible to further enhance the reliability of product reviews.

BRIEF DESCRIPTION OF DRAWINGS

FIG. 7 is a view showing an example of purchase information.

FIG. 8 is a view showing an example of delivery information.

FIG. 9 is a view showing an example of set product information

FIG. 28 is a view showing an example of writing restriction according to an alternative example.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of a review management system 1 according to an embodiment are described hereinafter with reference to FIGS. 1 to 22. The review management system 1 is a computer system that manages reviews of products purchased on an online shopping site. In the online shopping site, users can write comments and ratings on purchased products as reviews. The reviews are published on the web site, and other users can consider the reviews when determining whether or not to purchase a product. The contents and representation of reviews are not particularly limited. For example, the reviews may be represented by text, represented by ranks or indices with numerical values, represented by images (still images or moving images), marks and the like, or represented by a combination of those. The variety of products is not particularly limited, and it may be an arbitrary tangible object or an object related to an arbitrary service.

Figure 1:
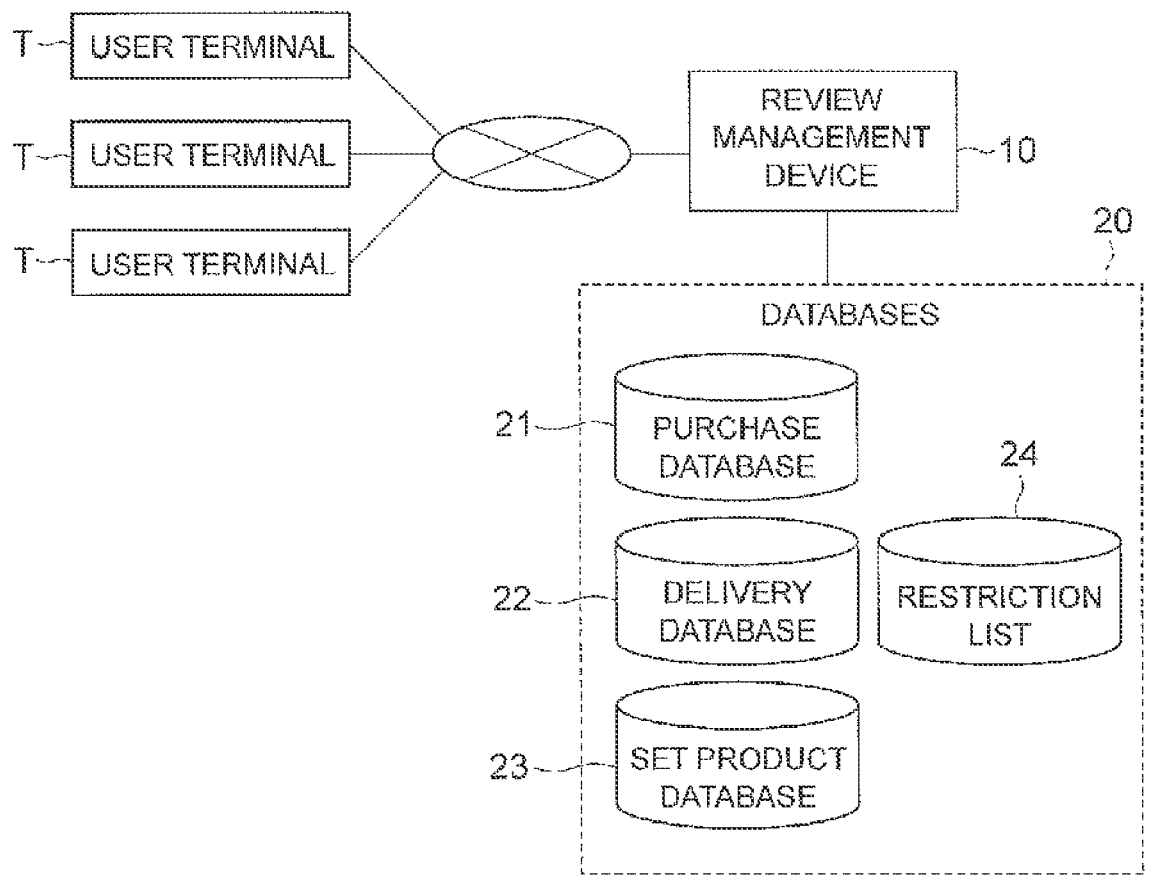
FIG. 1 is a view showing an overall configuration of a review management system according to an embodiment.

As shown in FIG. 1, the review management system 1 includes user terminals T, a review management device 10, and databases (storage unit) 20. The user terminals T and the review management device 10 are connected through a network such as the Internet. The review management device 10 can access the databases 20 through a network such as the Internet or a private line. Although three user terminals T are shown in FIG. 1, the number of user terminals T is not particularly limited.

The variety of the user terminals T is not particularly limited, and it may be a stationary or portable personal computer, or a mobile terminal such as an advanced mobile phone (smart phone), a cellular phone or a personal digital assistant (PDA), for example.

The review management system 1 is characterized in that it sets the timing to permit review writing. In this specification, a user who intends to write a review is referred to as "access user", and a product which is indicated as the target to be reviewed is referred to as "target product". Restriction and permission of writing are described hereinafter with reference to FIGS. 2 to 6.

Figure 2:
FIG. 2 is a view showing an example of a purchase history page.
Figure 3:
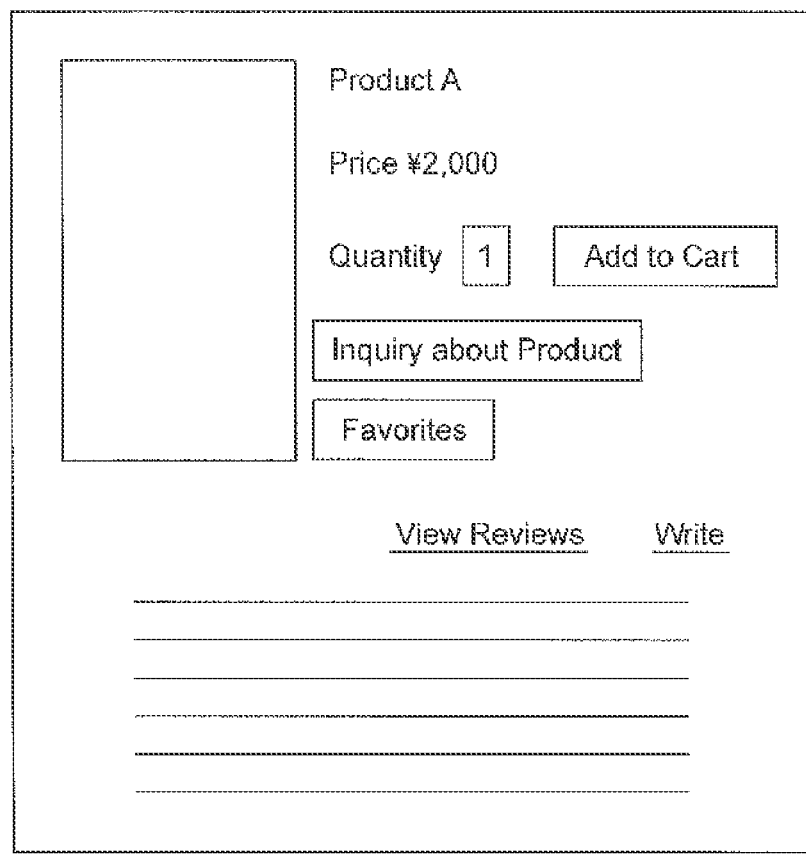
FIG. 3 is a view showing an example of a product page.

A user can log in the online shopping site and access the user's individual purchase history page. FIG. 2 shows an example of the purchase history page. In the purchase history page, the "Write a Review" button is prepared for each product, and a user can go to a review creation page by clicking on this button. Alternatively, a user can go to a review creation page by clicking on the "Write" link in the product page shown in FIG. 3. Note that, however, when a user clicks on the "Write" link in the product page, it is determined whether the user has purchased the product shown on the page before, and the user can go to the review creation page only when the user has purchased the product.

Figure 4:
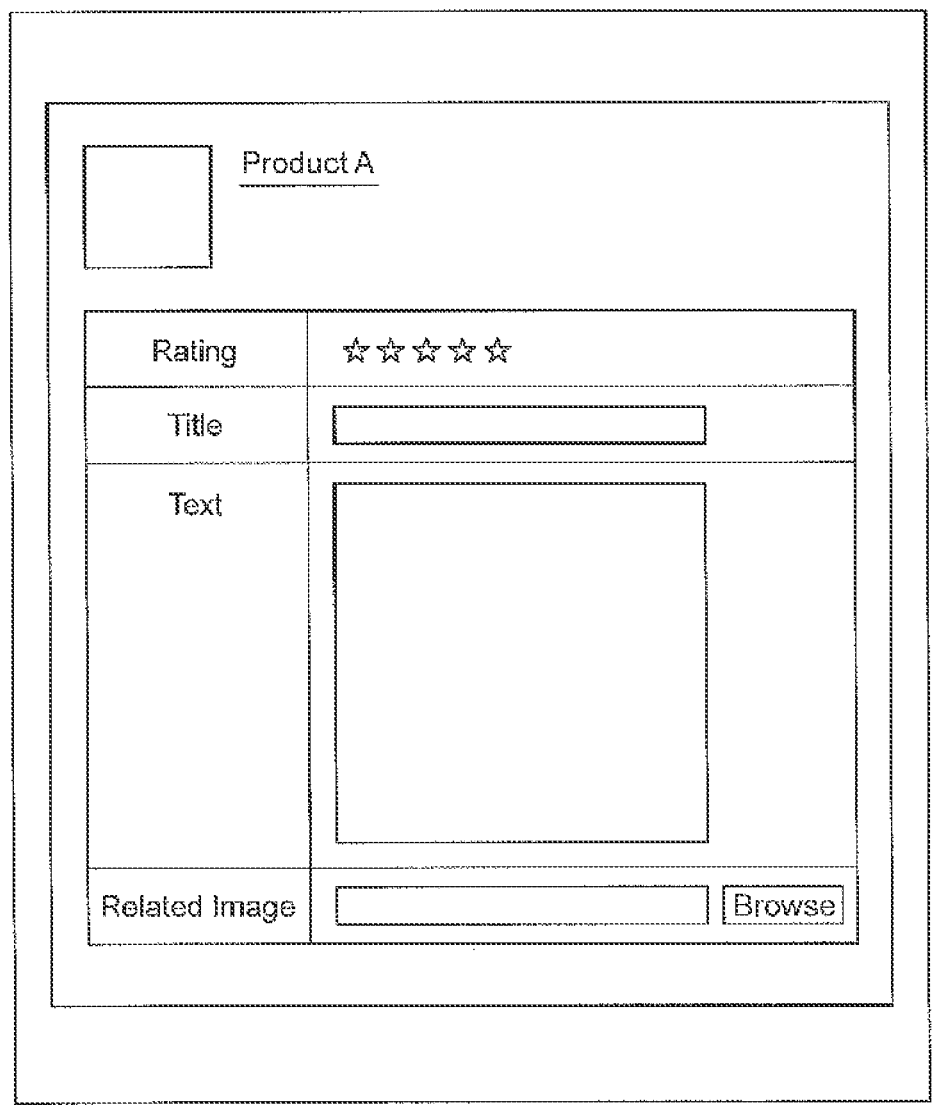
FIG. 4 is a view showing an example of a review writing page.
Figure 5:
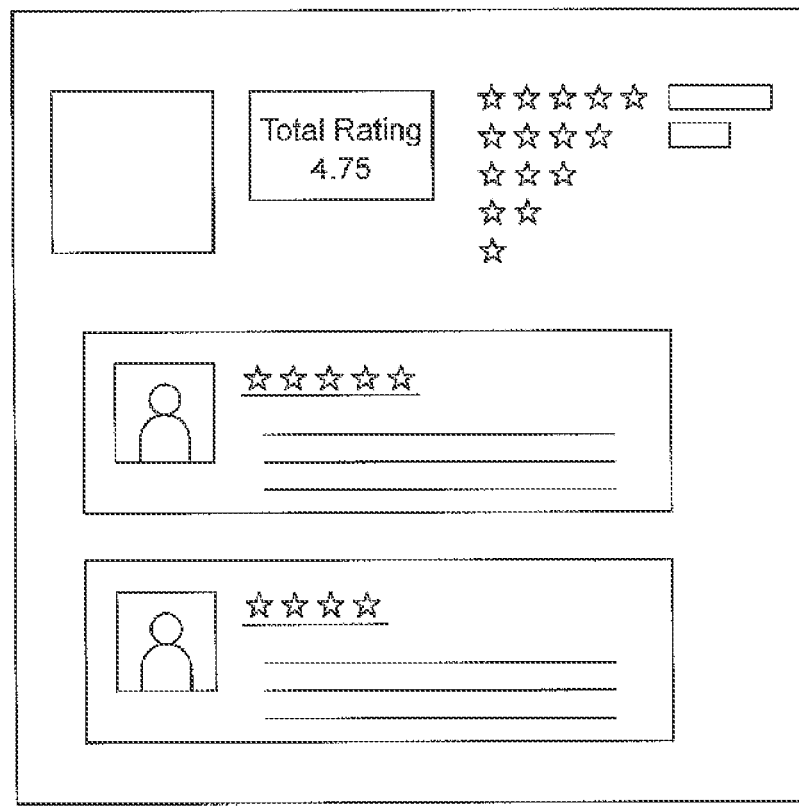
FIG. 5 is a view showing an example of a review page.

FIG. 4 shows an example of the review creation page. A user enters a rating out of five, a review title and text, a related image and the like on the review creation page and transmits them, and can thereby publish the review on the online shopping site. The registered review is displayed on the review page as shown in FIG. 5. Another user clicks on the "View Reviews" link in the product page shown in FIG. 3, for example, to display the review page of the product, and can thereby see the evaluations on the product by other people.

When a user completes a purchase procedure on the online shopping site, the procedure is registered as a purchase history. Thus, if no control is imposed on the timing of review writing, the user is able to access the purchase history page and write a product review immediately after completing the procedure. Because the user does not receive the purchased product at this point of time, if the writing of a product review is permitted in this situation, the user writes a review based on guesswork without actually knowing the usability of the product. Such a situation can occur when some privileges (such as points) are awarded to users in reward for review writing, for example.

Figure 6:
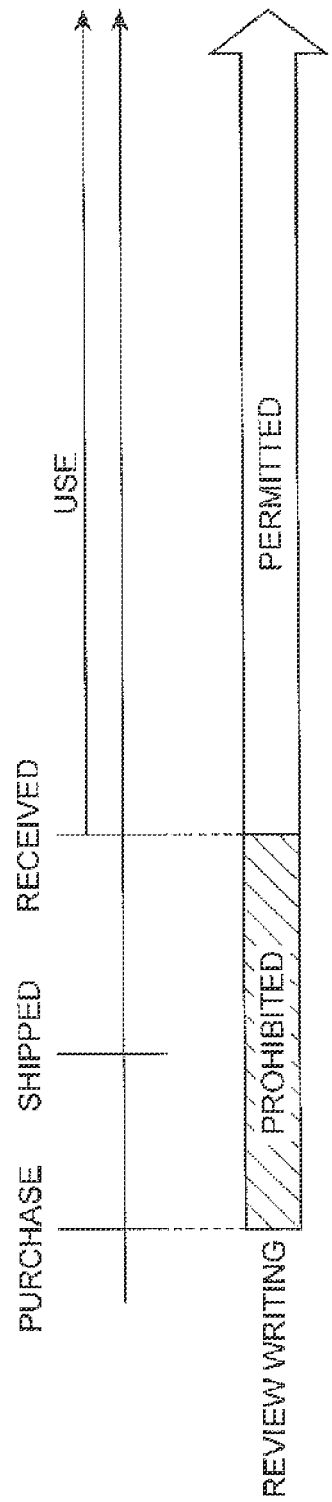
FIG. 6 is a view showing a concept of review writing restriction.

The review written in such a situation is not based on actual experiences, and therefore it is not necessarily a reliable review. Thus, as shown in FIG. 6, the review management system 1 determines whether a user has received a purchased product or not, and only after it determines that the user has received the product, permits the writing of a review of the product to the user. Note that, this embodiment is based on the assumption that a user cannot write a review of a product for which a purchase procedure is not done.

Each of the databases 20 that are accessed by the review management device 10 is described hereinbelow. The databases 20 are a group of various kinds of databases required in the review management system 1. Each of the databases 20 may be placed in any place, and the databases may be located together in one place or located in different places. The administrator of each database may be the same or different.

A purchase database 21 is a device that stores each of purchase information received by an online shopping site. When a user completes a purchase procedure (addition of a product to a shopping cart, selection of payment and delivery methods etc.), one record of purchase information is generated and stored into the purchase database 21. As shown in FIG. 7, the purchase information is a record in which a user ID that uniquely identifies a user (purchaser), an order number that uniquely identifies each order, order date and time, and a product ID that uniquely identifies a product are associated with one another. Because a user can purchase a plurality of products by one procedure, a plurality of product IDs can be associated with one order number.

A delivery database 22 is a device that stores information (delivery information) indicating the delivery status of an ordered product. A plurality of products purchased by one procedure may be delivered all at once or one at a time. In consideration of this, the delivery information is generated not for each order but for each product ordered. As shown in FIG. 8, the delivery information is a record in which an order number, a product ID, date and time when a product is shipped from a store (shipping date and time), and date and time when the product arrives at a user (purchaser) (received date and time) are associated with one another.

The shipping date and time is stored when a product is shipped from a store, and the received date and time is stored when a user receives the product. Thus, if both of the shipping date and time and the received date and time are NULL, the purchased product is not yet shipped from the store. If specific date and time is set to the shipping date and time but the received date and time is NULL, the purchased product is under shipment and does not yet arrive at the user. If specific date and time are set to both of the shipping date and time and the received date and time, the purchased product arrives at the user. Note that a system that updates the shipping date and time and the received date and time may be the review management system 1 or another system (for example, a system of a delivery company).

FIG. 8 shows that two kinds of products (the product ID "P0010" and "P1020") that have been ordered by the purchase procedure identified by the order number "C0001" have been shipped all at once and arrived at a user at the same time. As for the purchase procedure identified by the order number "C0003", while the product IDentified by the ID "P1020" has been shipped prior to the other two products (the product ID "P2030" and "P2050") and already arrived at a user, those two products have been shipped together but not yet arrived at the user. As for the purchase procedure identified by the order number "C0004", while one product (the product ID "P2020") has already arrived at a user, the other product (the product ID "P0010") has not yet shipped from a store. In this manner, by referring to the delivery information, it is possible to know the delivery information about each of the products ordered.

A set product database 23 is a device that stores set product information indicating a set of a plurality of kinds of products. The set product information is information indicating a combination of a plurality of kinds of products that are likely to be purchased and used at the same time, and it is uniquely identified by a set ID. The set product information is stored in advance by an administrator of the review management device 10. For example, a set of skis and poles, a set of skiwear top and bottom and the like are stored as the set product information. The number of varieties of products included in one set may be any number more than one.

FIG. 9 shows an example of the set product information. In this example, two kinds of products with the product ID "P0010" and "P0011" are stored as one set. One product may be stored as a plurality of sets, and a combination of two or more kinds of products may appear in a plurality of sets. In the example of FIG. 9, two kinds of products with the product ID "P1020" and "P2050" are stored as set products identified by the set ID "K0002" and also stored as a part of set products identified by the set ID "K0003".

Figure 10:
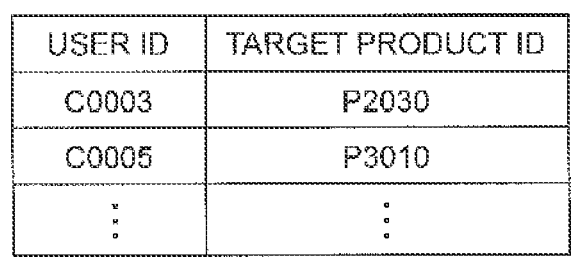
FIG. 10 is a view showing an example of restriction information.

A restriction list 24 is a device (database) that stores a pair of ID of an access user for whom it is determined that writing is prohibited and ID of a target product as restriction information. FIG. 10 shows an example of the restriction information. The restriction information is stored by the writing control unit 14 and deleted by the notification unit 15, which are described later.

The structures of each database and each record described above are not limited to those described above, and each database may be normalized or made redundant by an arbitrary policy. For example, the order information and the delivery information may be integrated into one record. Further, instead of the shipping date and time and the received date and time, the status such as "unshipped", "on delivery" or "received" may be set as an item of the delivery information.

As a matter of course, there may be other databases related to the online shopping site; however, explanation of other databases is omitted. For example, a user database that stores user information, a product database that stores product information, a store database that stores information of virtual stores and the like are not explained.

Figure 11:
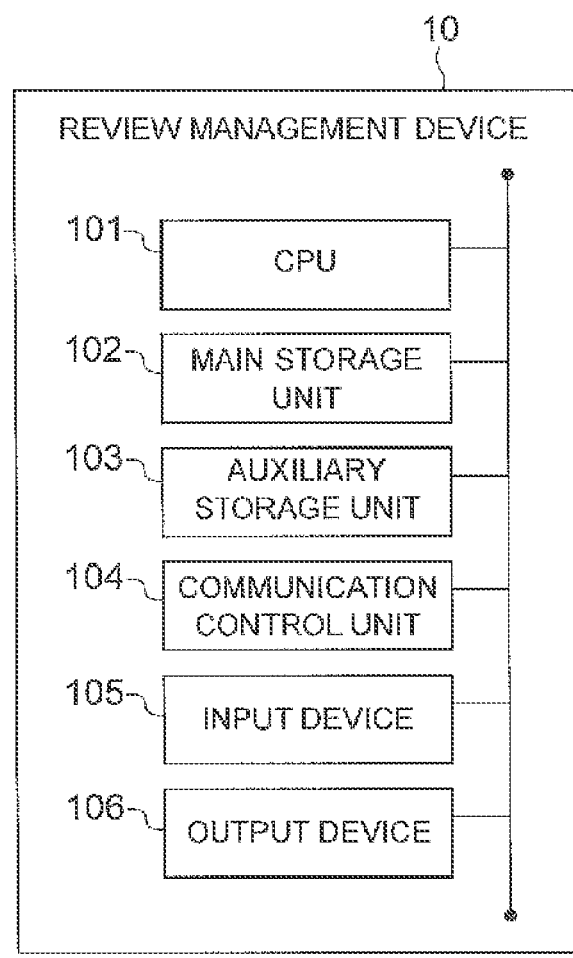
FIG. 11 is a view showing a hardware configuration of a review management device according to the embodiment.

The functions and configuration of the review management device 10 are described hereinafter. FIG. 11 shows a hardware configuration of the review management device 10. As shown therein, the review management device 10 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display.

The functional elements of the review management device 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Although the review management device 10 is composed of one computer in the example of FIG. 11, the review management device 10 may be composed of a plurality of computers.

Figure 12:
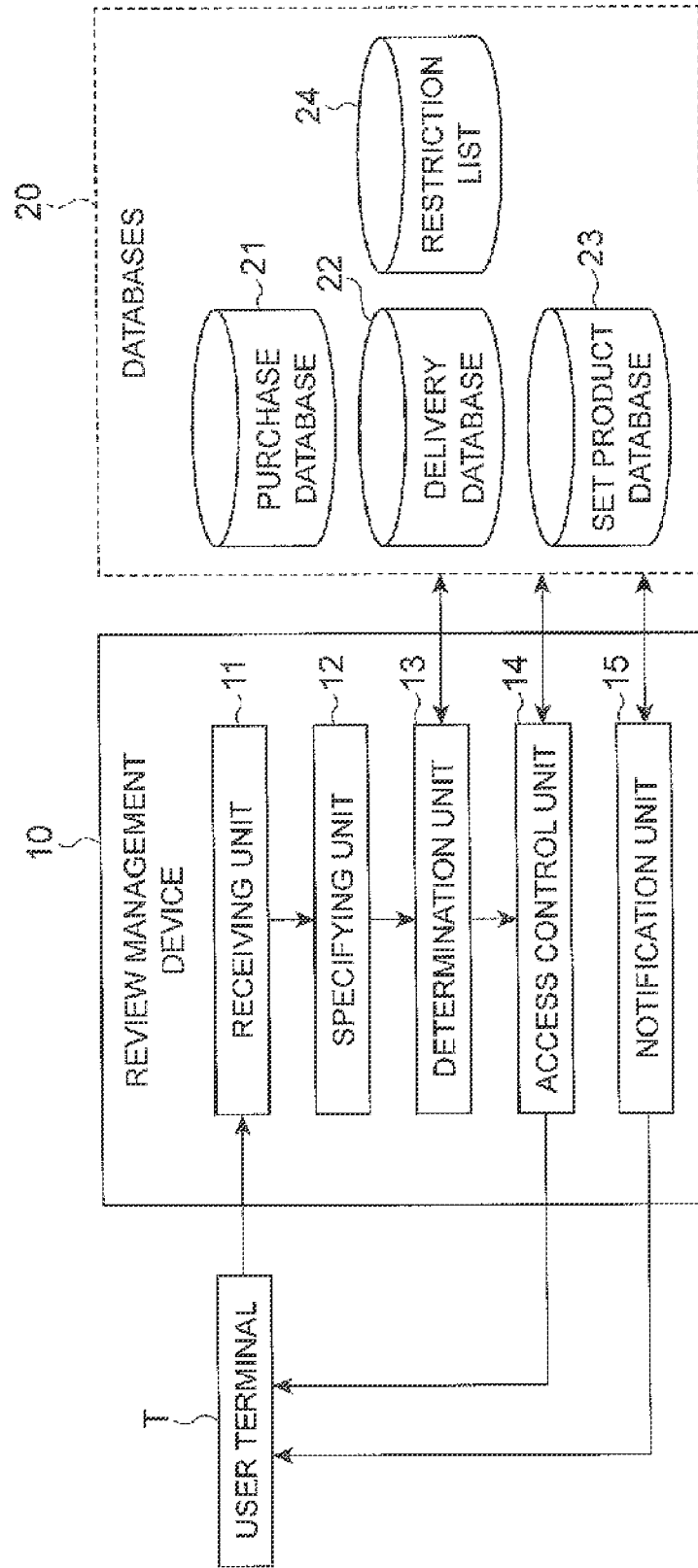
FIG. 12 is a view showing a functional configuration of the review management device according to the embodiment.

As shown in FIG. 12, the review management device 10 includes, as functional elements, a receiving unit 11, a specifying unit 12, a determination unit 13, a writing control unit 14, and a notification unit 15.

The receiving unit 11 is a functional element that receives a product review write request from the user terminal T. When the "Write a Review" button for a certain product is pressed in the purchase history page, the user terminal T generates an HTTP request for obtaining the review writing page for the product and transmits the HTTP request as a write request to the review management device 10. The write request contains ID of a user who intends to write a review and ID of a product to be reviewed. The receiving unit 11 outputs the write request received from the user terminal T to the specifying unit 12.

The specifying unit 12 is a functional element that specifies an access user and a target product based on the write request. The specifying unit 12 performs this specifying processing by reading the user ID and the product ID from the write request. The specifying unit 12 outputs the user ID and the product ID to the determination unit 13.

The determination unit 13 is a functional element that determines whether the access user has received the product purchased on the online shopping site. For this processing, the determination unit 13 refers to the purchase database 21 and the delivery database 22. In this specification, the purchase information and the delivery information that are associated with each other through the order number and the product ID are also referred to collectively as "order information". Accordingly, the order information contains the data items of both of the purchase information and the delivery information corresponding to each other.

First, the determination unit 13 refers to the purchase database 21 and the delivery database 22 and extracts the last order information stored which corresponds to the user ID and the product ID input from the specifying unit 12 as the latest order information. The latest order information is information indicating the latest order of the target product by the access user. Next, the determination unit 13 determines that the access user has received the target product when the received date and time is set for the latest order information, and determines that the access user has not received the product when the received date and time is NULL.

Then, the determination unit 13 determines whether the access user has purchased and received the target product in the past. The determination unit 13 refers to the purchase database 21 and the delivery database 22 again by using the user ID and the product ID and extracts the order information which corresponds to those IDs and which is made before the latest order information. The past order information acquired in this step is the order information whose order date and time is before those of the latest order information and for which the received date and time is set. Accordingly, the fact that such past order information is extracted means that the access user has obtained the target product in the past. The determination unit 13 may extract at least one past order information or may extract no such information.

Then, the determination unit 13 determines whether the access user has concurrently purchased another product (related product) that forms set products with the target product. The "related product purchased concurrently with the target product" is the related product which the access user purchases or receives during the period of waiting for the arrival of the target product corresponding to the latest order (the period from purchasing to receiving the target product). In this specification, the order of the related product which the access user purchases or receives during this period is also referred to as "concurrent order". The concurrent order includes the case where the access user purchases or receives the target product and the related product all at once.

First, the determination unit 13 specifies ID of the related product by extracting the set product information where the target product is included in the product list from the set product database 23. When there is no set product information, the determination unit 13 ends the process for the related product. When the set product information is found, the determination unit 13 refers to the purchase database 21 and the delivery database 22 and extracts the order information which corresponds to the user ID of the access user and the related product ID and which is the concurrent order, as the concurrent order information. The determination unit 13 may extract at least one concurrent order information or may extract no such information.

When the concurrent order information is extracted, the determination unit 13 determines that the access user has received the related product when the received date and time is set for the information, and determines that the access user has not received the related product when the received date and time is NULL. When there are a plurality of concurrent order information, the determination unit 13 determines the delivery status for each of the related products.

The processing of the determination unit 13 in the case where ID of the access user is "U001" and ID of the target product is "P0010" is described, assuming the use of the data shown in FIGS. 7 to 9. First, the determination unit 13 extracts the order information with the order number "C0004" and the product ID "P0010" as the latest order information. The determination unit 13 then extracts the order information with the order number "C0001" and the product ID "P0010" as the past order information. After that, the determination unit 13 refers to the set product database 23 and specifies the related product ID "P0011". However, because there is no order information that corresponds to both of the user ID "U001" and the product ID "P0011", the determination unit 13 does not extract the concurrent order information.

As another example, the processing of the determination unit 13 in the case where ID of the access user is "U003" and ID of the target product is "P1020" is described. First, the determination unit 13 extracts the order information with the order number "C0003" and the product ID "P1020" as the latest order information. The determination unit 13 then tries to extract the past order information corresponding to the access user and the target product, but there is no past order information in this example.

After that, the determination unit 13 refers to the set product database 23 and specifies the related product ID "P2050" and "P2060" from the set product information corresponding to the set ID "K0002" and "K0003". Then, the determination unit 13 extracts the order information corresponding to both of the user ID "U003" and the product ID "P2050" as the concurrent order information. However, there is no concurrent order information that corresponds to both of the user ID "U003" and the product ID "P2060". Thus, while the determination unit 13 performs the processing for the set products with the set ID "K0002", it does not perform the processing for the set products with the set ID "K0003".

After determining the delivery status of the target product and the delivery status of the related product, if any, the determination unit 13 outputs the order information (the latest order information, the past order information, or the concurrent order information) for those products to the writing control unit 14. Further, the determination unit 13 outputs the determination result as to whether the user has received the target product/the related product to the writing control unit 14.

The writing control unit 14 is a functional element that controls the writing of a review by the access user. The writing control unit 14 controls the writing of a review on the target product based only on the delivery status corresponding to the latest order information in some cases, and controls the writing based not only on the latest order information but also on the past order information in other cases. Further, in still other cases, the writing control unit 14 controls the writing based not only on the delivery status of the target product but also on the delivery status of the related product. Various control methods are described hereinbelow.

Figure 13:
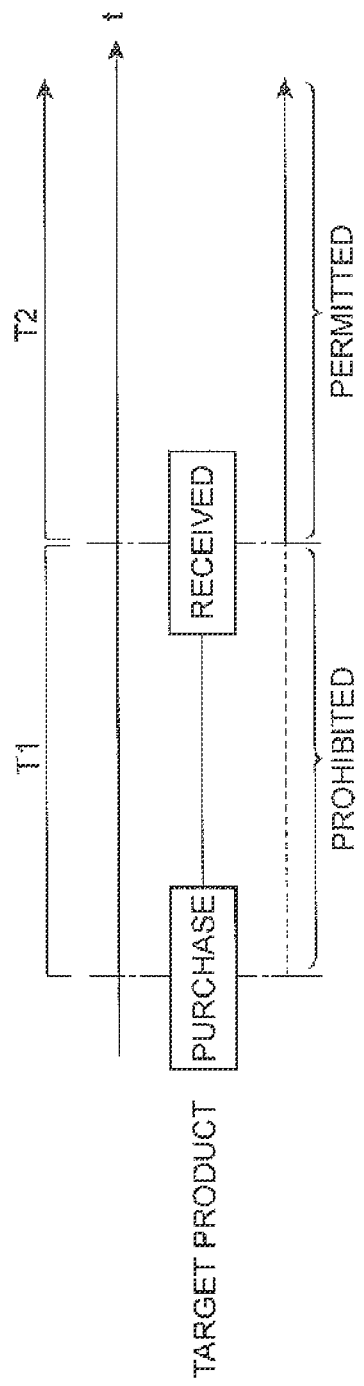
FIG. 13 is a view showing an example of writing restriction.

The processing in the case where only the latest order of the target product is obtained is described with reference to FIG. 13. When the received date and time for the latest order information is not set (the received date and time is NULL), the writing control unit 14 prohibits the writing of a review by the access user. On the other hand, when the received date and time for the latest order information is set, the writing control unit 14 permits the writing. As shown in FIG. 13, the writing control unit 14 prohibits the writing during the period T1 when the access user does not receive the target product, and permits the writing during the period T2 after the access user receives the target product.

The processing in the case where the latest order and the past order of the target product are obtained is described with reference to FIGS. 14 to 16.

When the received date and time is set for the latest order information, the writing control unit 14 permits the writing of a review by the access user. Even when the received date and time is not set for the latest order information, because the past order information exists, the writing control unit 14 permits the writing of a review. As described above, because the received date and time is always set for the order information of the target product that is extracted as the past order information, the writing control unit 14 can permit the writing of a review. When the user purchases the product that has been purchased and received in the past again, the user already knows the product at the time of the re-purchase. Therefore, when the user purchases the same product again, there is no need to determine whether the access user has received the re-purchased product and restrict the writing.

Figure 14:
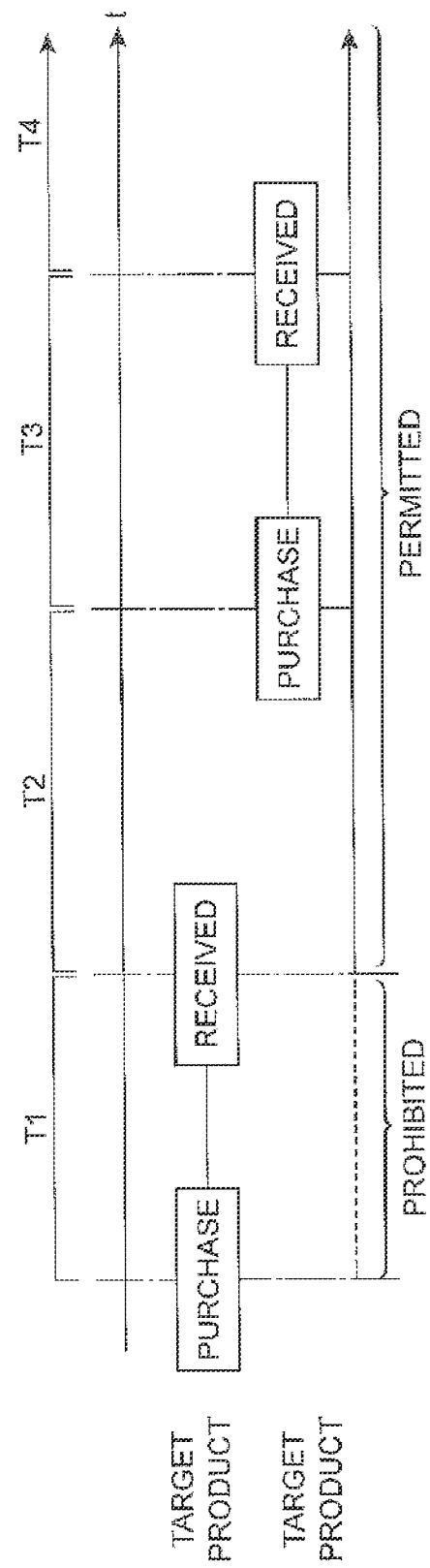
FIG. 14 is a view showing an example of writing restriction.

FIG. 14 shows an example in which, after the access user purchases and receives the target product first, the user purchases the target product again. In this example, the writing control unit 14 prohibits the writing during the period T1 and permits the writing only after the period T2, just like the example of FIG. 13. After that, even when the access user purchases the target product again, the writing control unit 14 continues to permit the writing of a review on the product. In other words, the writing control unit 14 continues to permit the writing during the periods T3 and T4.

Because the access user already knows the product at the time of the re-purchase, there is no need to prohibit the writing during the period T3 from re-purchasing to receiving the product.

Figure 15:
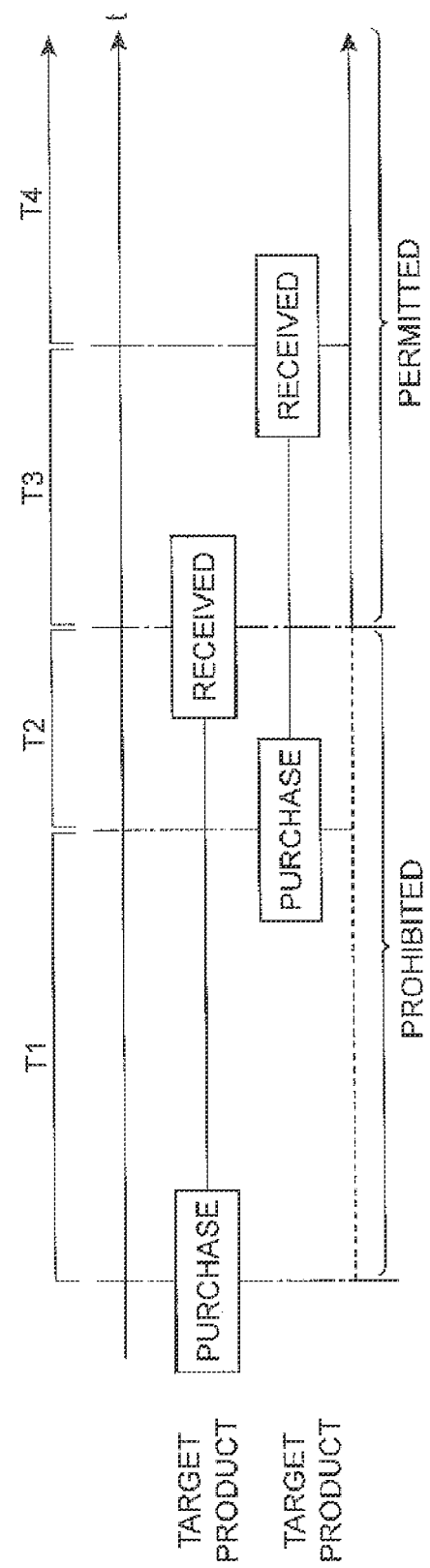
FIG. 15 is a view showing an example of writing restriction.

FIG. 15 shows an example in which, after the access user purchases the target product first, the user purchases the target product again before receiving it. In the period T1, because the received date and time for the extracted latest order information is NULL, the writing control unit 14 prohibits the writing. In the period T2, the received date and time for the extracted latest order information is NULL. Further, in the period T2, because the access user does not receive any of the two target products, the past order information is not extracted. Accordingly, the writing control unit 14 prohibits the writing. In the period T3, because the past order information exists, the writing control unit 14 permits the writing. In the period T4, because the received date and time for the latest order information is set (or because the past order information exists), the writing control unit 14 permits the writing. In summary, the writing control unit 14 prohibits the writing during the periods T1 and T2 and permits the writing during the periods after that (T3 and T4).

Figure 16:
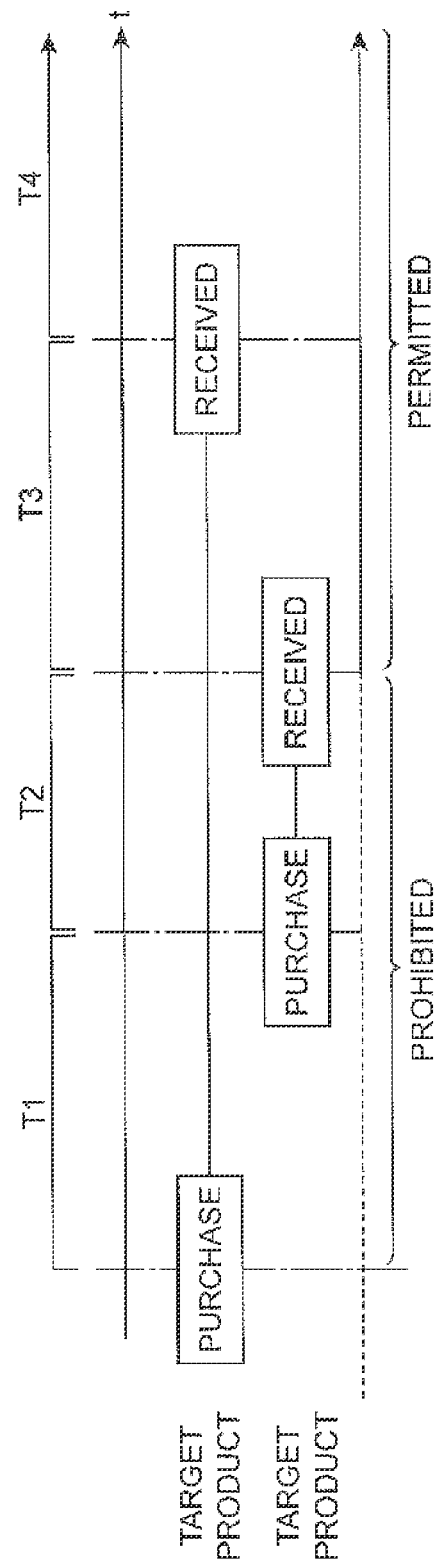
FIG. 16 is a view showing an example of writing restriction.

FIG. 16 also shows an example in which, after the access user purchases the target product first, the user purchases the target product again before receiving it. In this example, however, the sequence of receiving the product is different from that of the example in FIG. 15. In the period T1, because the received date and time for the extracted latest order information is NULL, the writing control unit 14 prohibits the writing. In the period T2, because the received date and time for the extracted latest order information is NULL and the past order information does not exist, the writing control unit 14 prohibits the writing. In the period T3, because the received date and time for the latest order information is set, the writing control unit 14 permits the writing. In the period T4 also, the writing control unit 14 permits the writing for the same reason. In summary, the writing control unit 14 prohibits the writing during the periods T1 and T2 and permits the writing during the periods after that (T3 and T4).

The processing in the case where the latest order of the target product and the concurrent order of the related product are obtained is described with reference to FIGS. 17 to 20.

When the concurrent order information is extracted, the writing control unit 14 controls the writing of a review on the target product based not only on the delivery status of the target product but also on the delivery status of the related product. Specifically, the writing control unit 14 permits the writing only after the point of time when the access user receives both of the target product and the related product.

Figure 17:
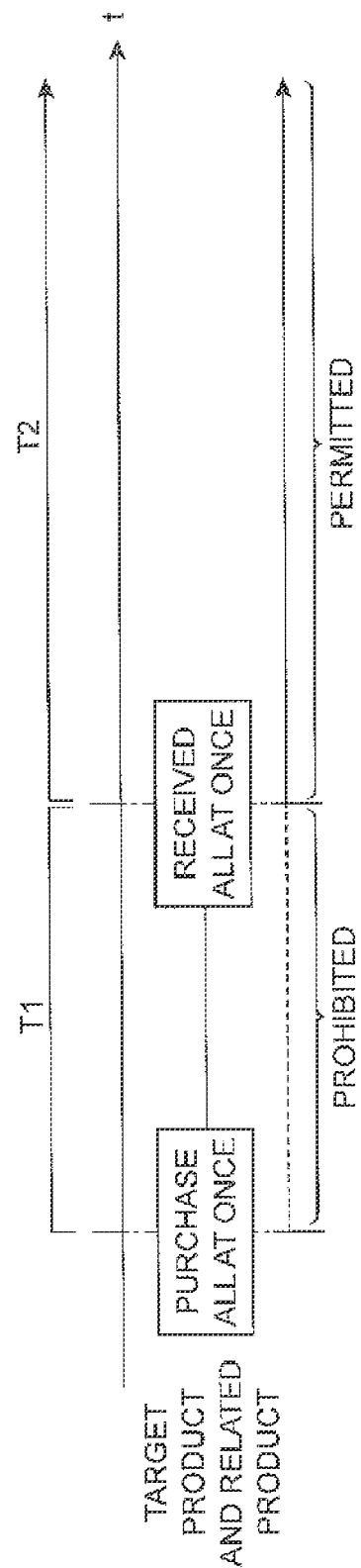
FIG. 17 is a view showing an example of writing restriction.

In the case of receiving the products all at once as shown in FIG. 17, the writing control unit prohibits the writing during the period T1 and permits the writing during the period T2 after the access user receives the products all at once. Note that this processing is applied also to the case where the timing of purchase is different between the target product and the related product but the access user receives those products all at once.

Figure 18:
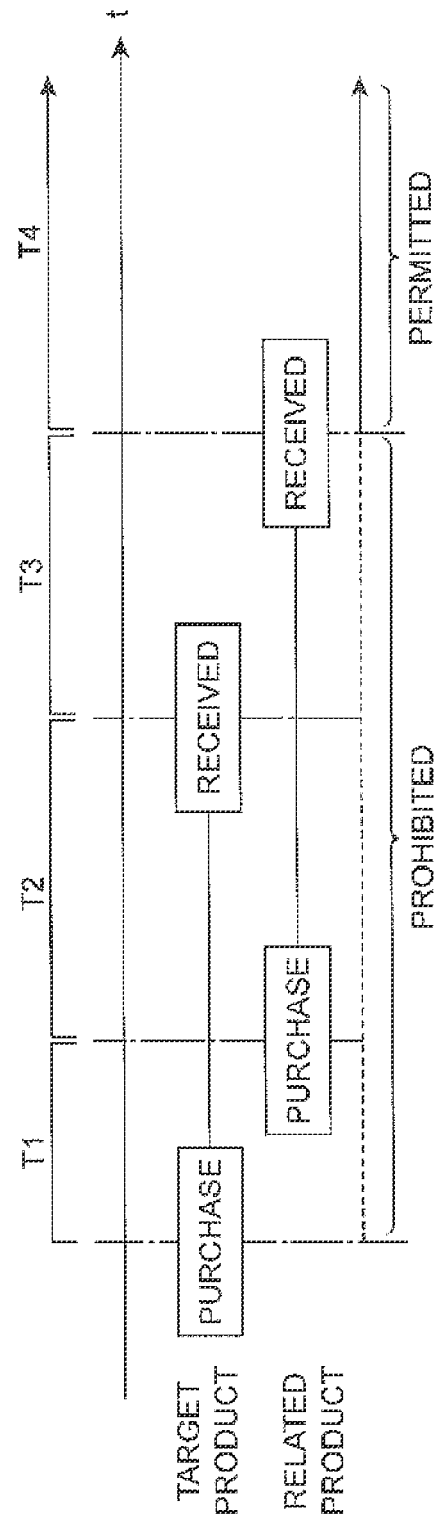
FIG. 18 is a view showing an example of writing restriction.

In the case of FIG. 18, because the user has not received the related product at the point of time when the user receives the target product, the writing control unit 14 prohibits the writing not only during the periods T1 and T2 but also during the period T3, and then permits the writing during the period T4 after receiving the related product.

Figure 19:
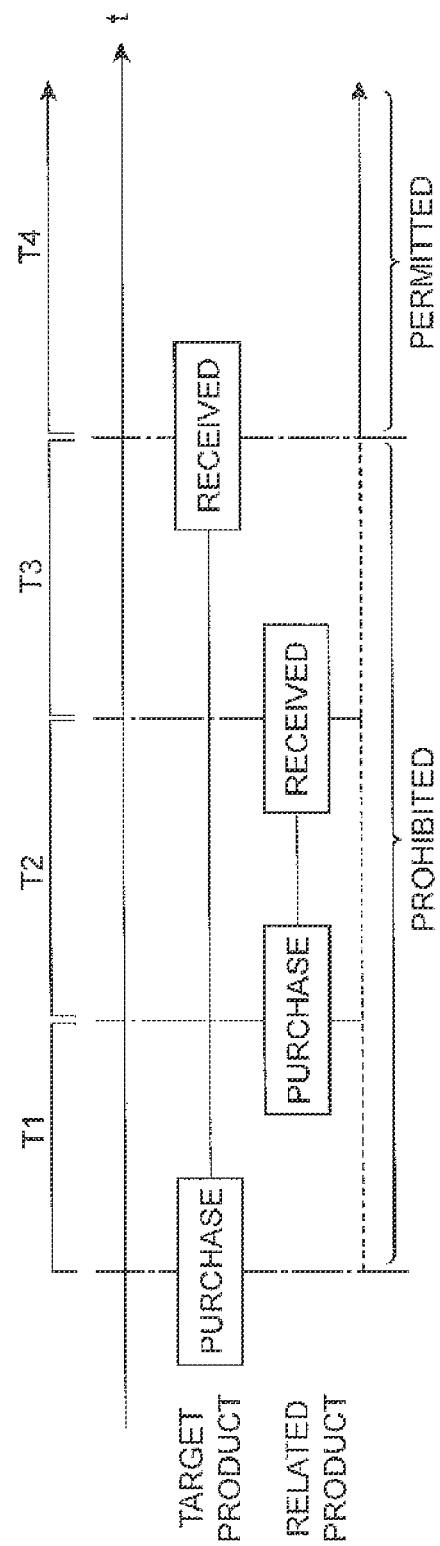
FIG. 19 is a view showing an example of writing restriction.

In the case of FIG. 19, the user has received the related product at the point of time when the user receives the target product. The writing control unit 14 prohibits the writing during the periods T1 to T3, and then permits the writing during the period T4 after receiving the target product.

Figure 20:
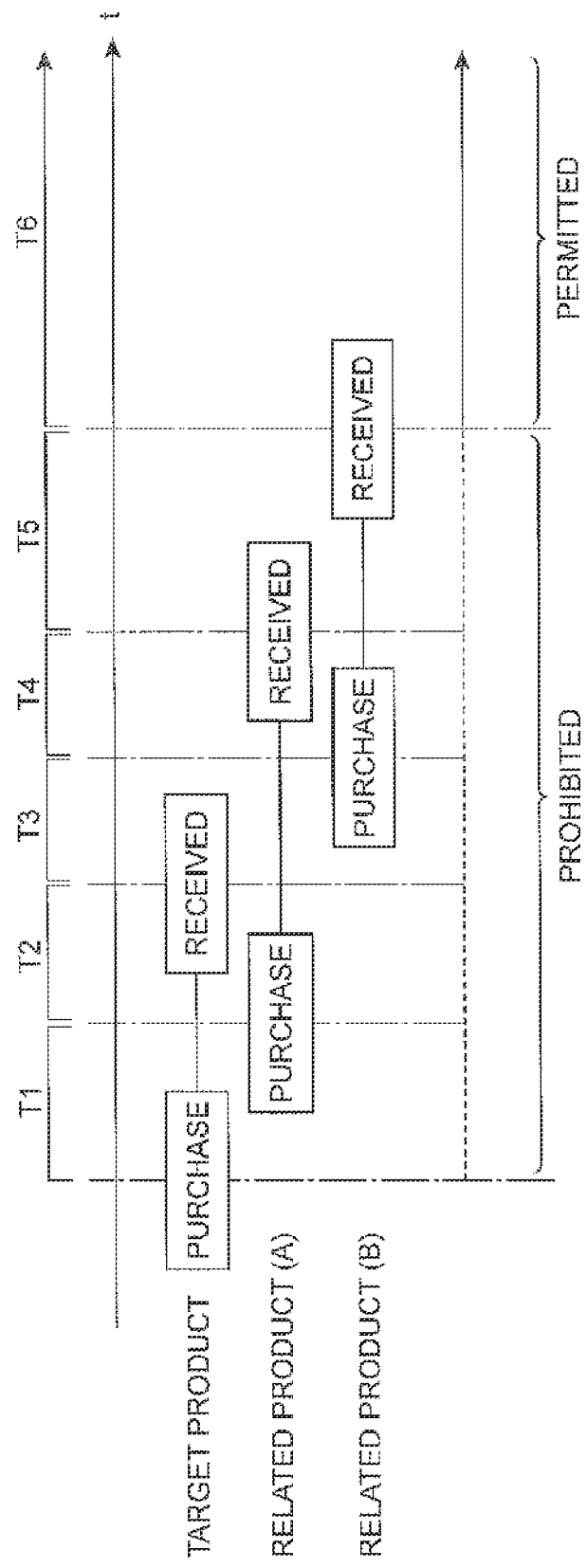
FIG. 20 is a view showing an example of writing restriction.

This processing is the same when the product set includes three or more products. This processing is described with reference to FIG. 20. FIG. 20 shows an example in which the access user sequentially purchases and receives three kinds of products that form the product set.

In this example, because the related product (A) has not been received during the periods T3 and T4, the writing control unit 14 prohibits the writing of a review on the target product in those periods. Further, during the period T5, the access user further purchases the related product (B) while waiting for the arrival of the related product (A), and because the user has not received the related product (B), the writing control unit 14 continues to prohibit the writing. Eventually, the writing control unit 14 permits the writing only during the period T6 after receiving the target product and the two related products (A) and (B).

In the example of FIG. 20, if the point of time when the related product (B) is purchased is after the period T4, the purchase of the set products stops at the end of the period T4. In this case, the writing control unit 14 permits the writing of a review on the target product on or after the period T5.

In this manner, when the target product is a part of the set products and the related product is ordered concurrently with the target product, it is highly possible that the access user uses those products at the same time. Thus, by permitting the writing of a review on the target product only after receiving not only the target product but also the related product, it is expected to enhance the reliability of the review on the target product. Further, by permitting the writing of a review on the target product only after the purchase of the set products stops, it is possible to avoid the situation where the access user cannot write a review on the target product for a long time.

The processing in the case where the latest order and the past order of the target product and the concurrent order of the related product are obtained is described with reference to FIGS. 21 and 22.

Figure 21:
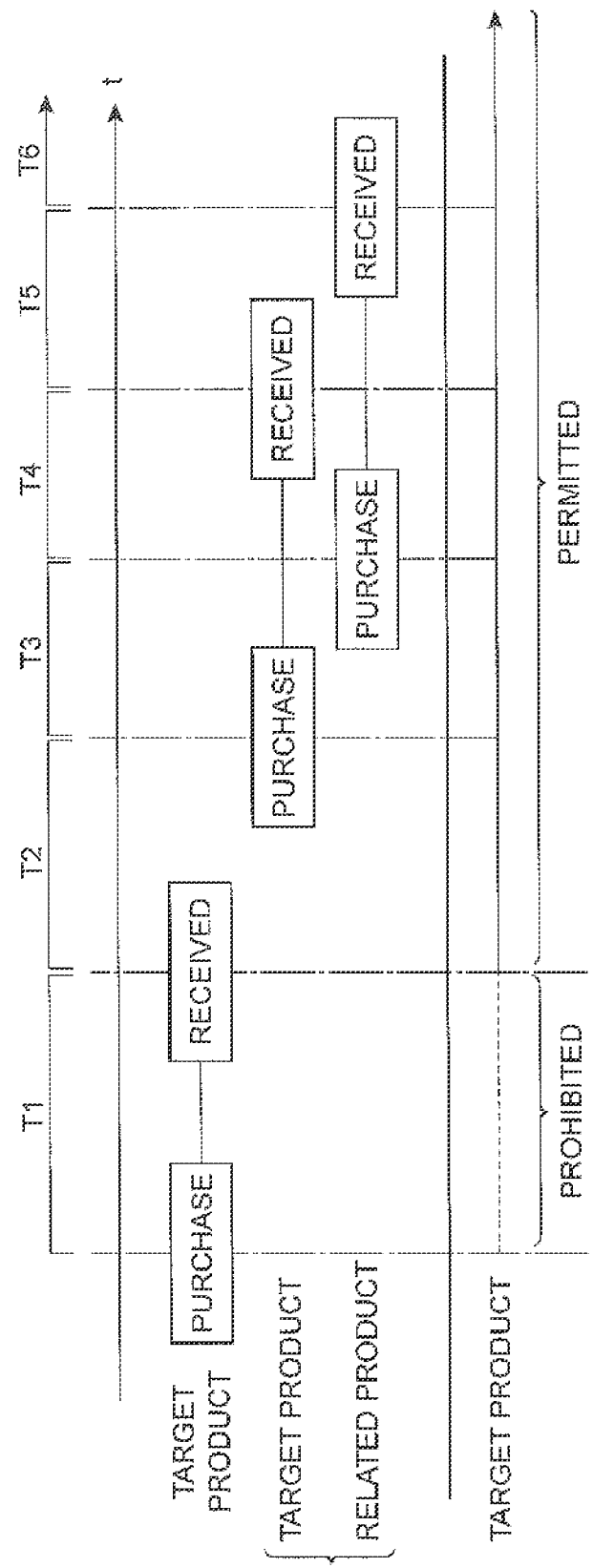
FIG. 21 is a view showing an example of writing restriction.

In the example of FIG. 21, the writing of a review is already permitted during the period T2 after the point of time when the access user has purchased and received the target product independently in the past. Thus, even when the access user purchases the target product and the related product as a set after that, the writing control unit 14 continues to permit the writing of a review on the target product. In other words, the writing control unit 14 permits the writing during the periods T2 to T6.

Figure 22:
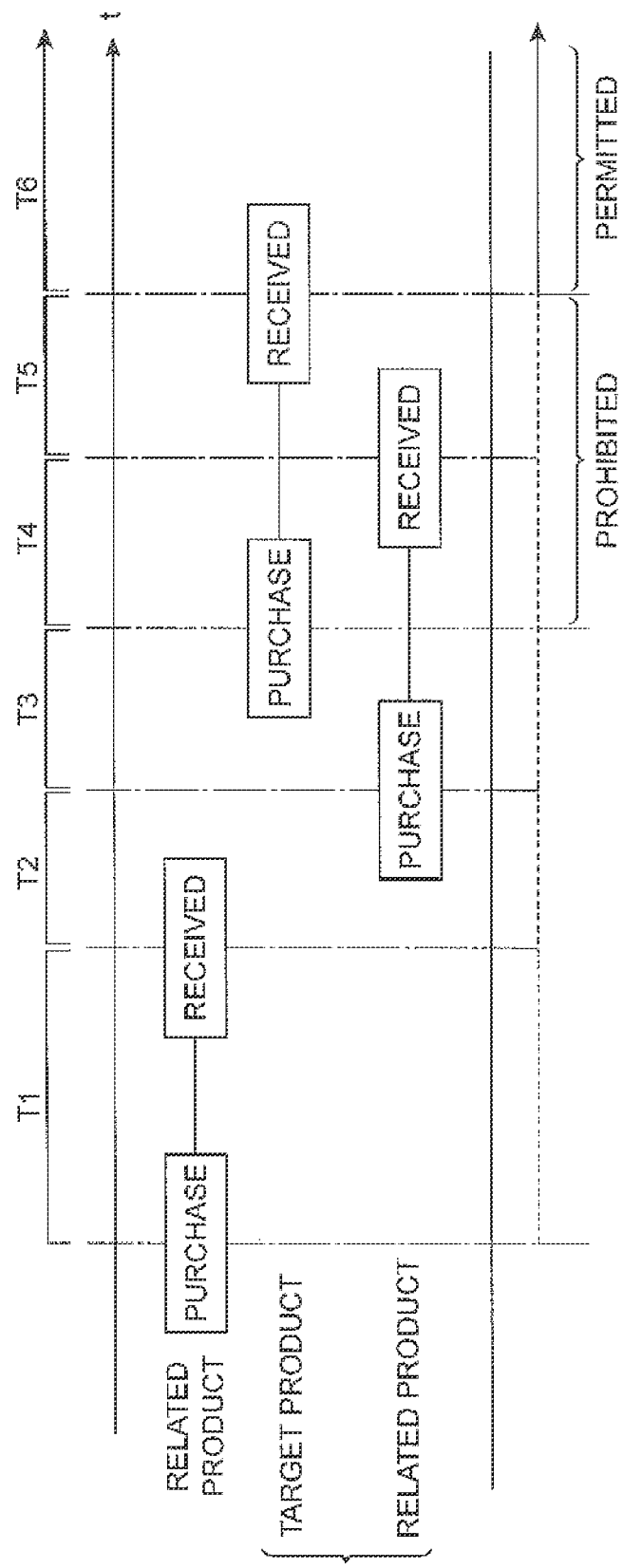
FIG. 22 is a view showing an example of writing restriction.

In the example of FIG. 22, while the access user has purchased the related product independently in the past, the user has not purchased the target product in the past. Thus, the writing control unit 14 does not permit the writing of a review during the periods T4 and T5 where the access user has purchased the target product but not yet received it, and then permits the writing during the period T6 after receiving the target product.

In the case of prohibiting the writing, the writing control unit 14 generates a web page or a message indicating that the writing of a review on the target product is unavailable, and transmits the web page or the message to the user terminal T as a response to the write request. Further, the writing control unit 14 generates restriction information by associating ID of the access user who is prohibited from the writing and ID of the target product and stores the restriction information into the restriction list 24.

On the other hand, in the case of permitting the writing, the writing control unit 14 generates the review creation page as shown in FIG. 4 and transmits it to the user terminal T. The user terminal T displays the page on the screen. The user can create a review and publish it through the review creation page.

The notification unit 15 is a functional element that, when permitting the writing that has been prohibited by the writing control unit 14, notifies the access user of the permission. In other words, the notification unit 15 notifies the user that the writing of a review on the target product has become available. The notification unit 15 performs the following processing at certain time intervals (for example, 1 hour, 12 hours, 24 hours etc.).

First, the notification unit 15 reads one piece of restriction information from the restriction list 24. Next, the notification unit 15 performs the same processing as the determination unit 13 based on the user ID and the target product ID indicated by the information and further performs determination about whether or not to permit the writing, which is described above for the writing control unit 14.

When it is determined to permit the writing, the notification unit 15 generates a message indicating that the writing of a review on the target product is available and notifies it to the user. The way of notification is not limited, and E-mail may be used, or the message may be embedded in the purchase history page of the user, for example. Further, the notification unit 15 deletes the read restriction information from the restriction list 24. On the other hand, when it is determined to prohibit the writing, the notification unit 15 ends the process without notification and record deletion.

The notification unit 15 performs the above processing for all of the restriction information in the restriction list 24.

Figure 23:
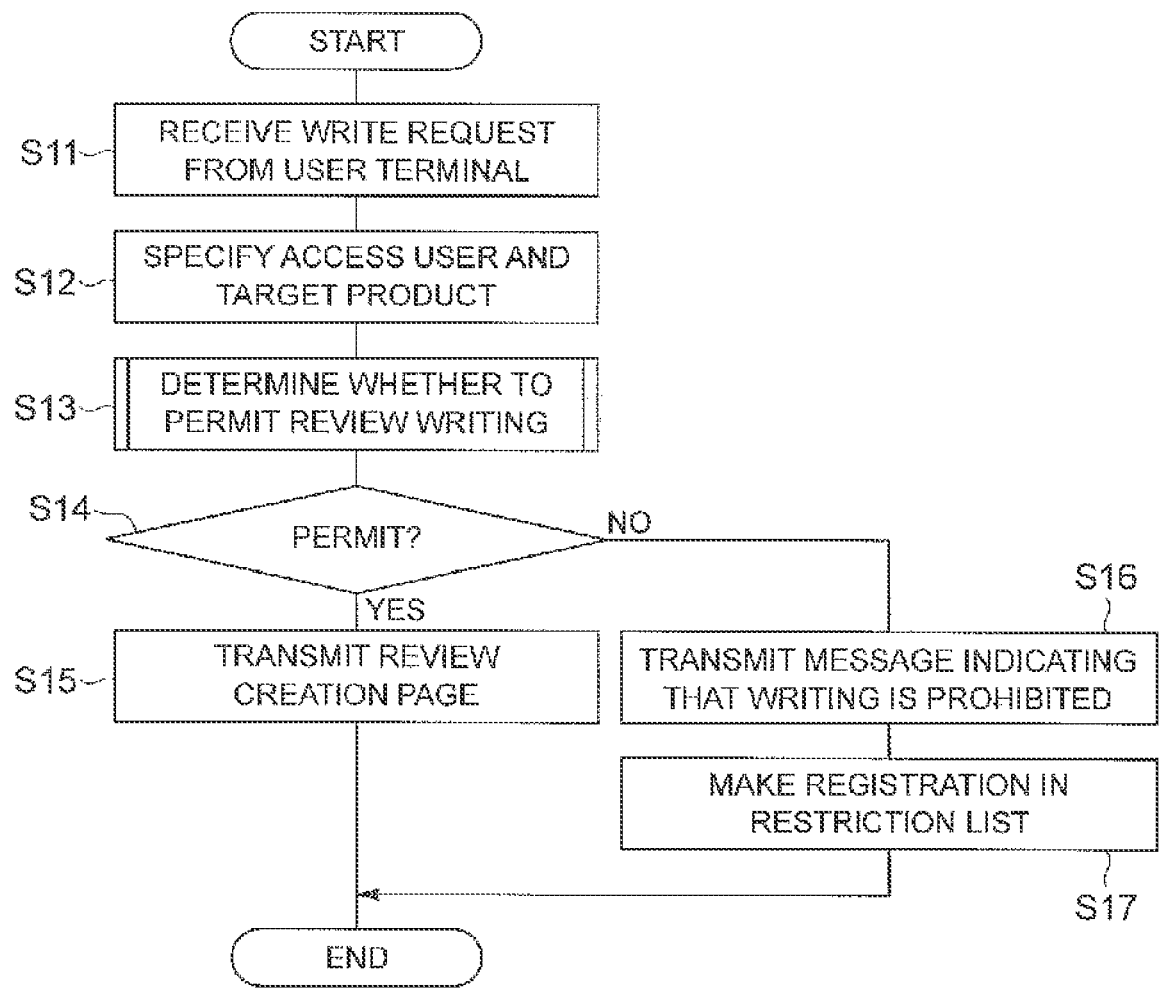
FIG. 23 is a flowchart showing an operation of the review management device according to the embodiment.

The operation of the review management device 10 is described, and further a review management method according to this embodiment is described hereinafter with reference to FIGS. 23 to 25.

First, the receiving unit 11 receives a write request from the user terminal T (Step S11), and the specifying unit 12 analyzes the write request and thereby specifies the access user and the target product (Step S12, specifying step). Then, the determination unit 13 and the writing control unit 14 determine whether or not to permit the review writing in collaboration with each other (Step S13, determination step).

Figure 24:
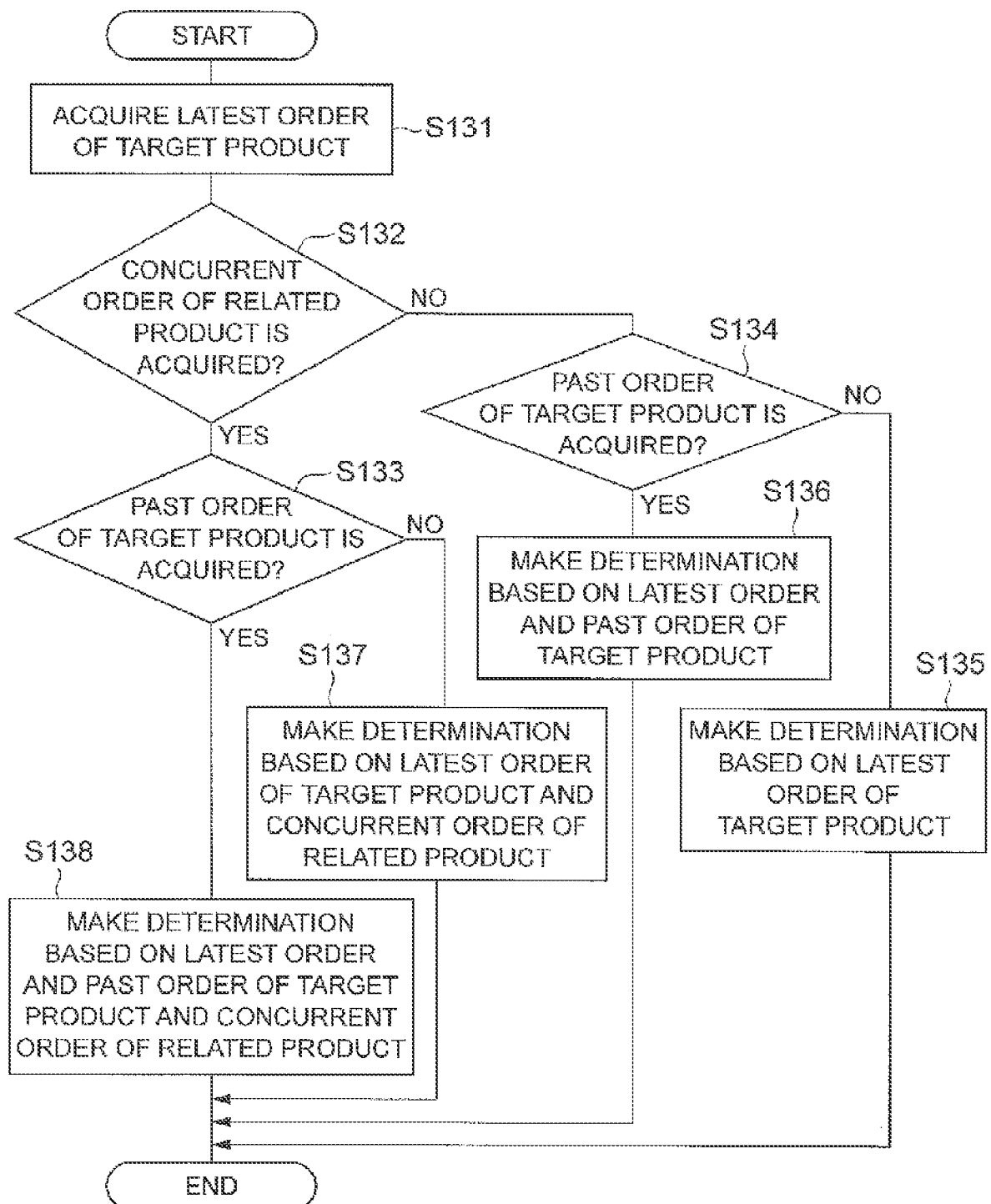
FIG. 24 is a flowchart showing details of determination processing shown in FIG. 23.

A specific flow of the determination is shown in Steps S131 to S138 in FIG. 24. Specifically, when only the latest order of the target product is acquired, determination based on the latest order is performed (Step S135). When the concurrent order of the related product is not acquired and the latest order and the past order of the target product are acquired, the determination unit 13 performs determination based on those two types of orders (Step S136). When the past order of the target product is not acquired and the latest order of the target product and the concurrent order of the related product are acquired, the determination unit 13 performs determination based on those two types of orders (Step S137). When the latest order and the past order of the target product and the concurrent order of the related product are acquired, the determination unit 13 performs determination based on those three types of orders (Step S138).

Referring back to FIG. 23, when it is determined to permit the writing (YES in Step S14), the writing control unit 14 transmits the review creation page to the user terminal T (Step S15, writing control step). On the other hand, when it is determined to prohibit the writing (NO in Step S14), the writing control unit 14 transmits the message indicating that the writing is prohibited to the user terminal T (Step S16, writing control step) and generates restriction information and stores it into the restriction list 24 (Step S17).

Figure 25:
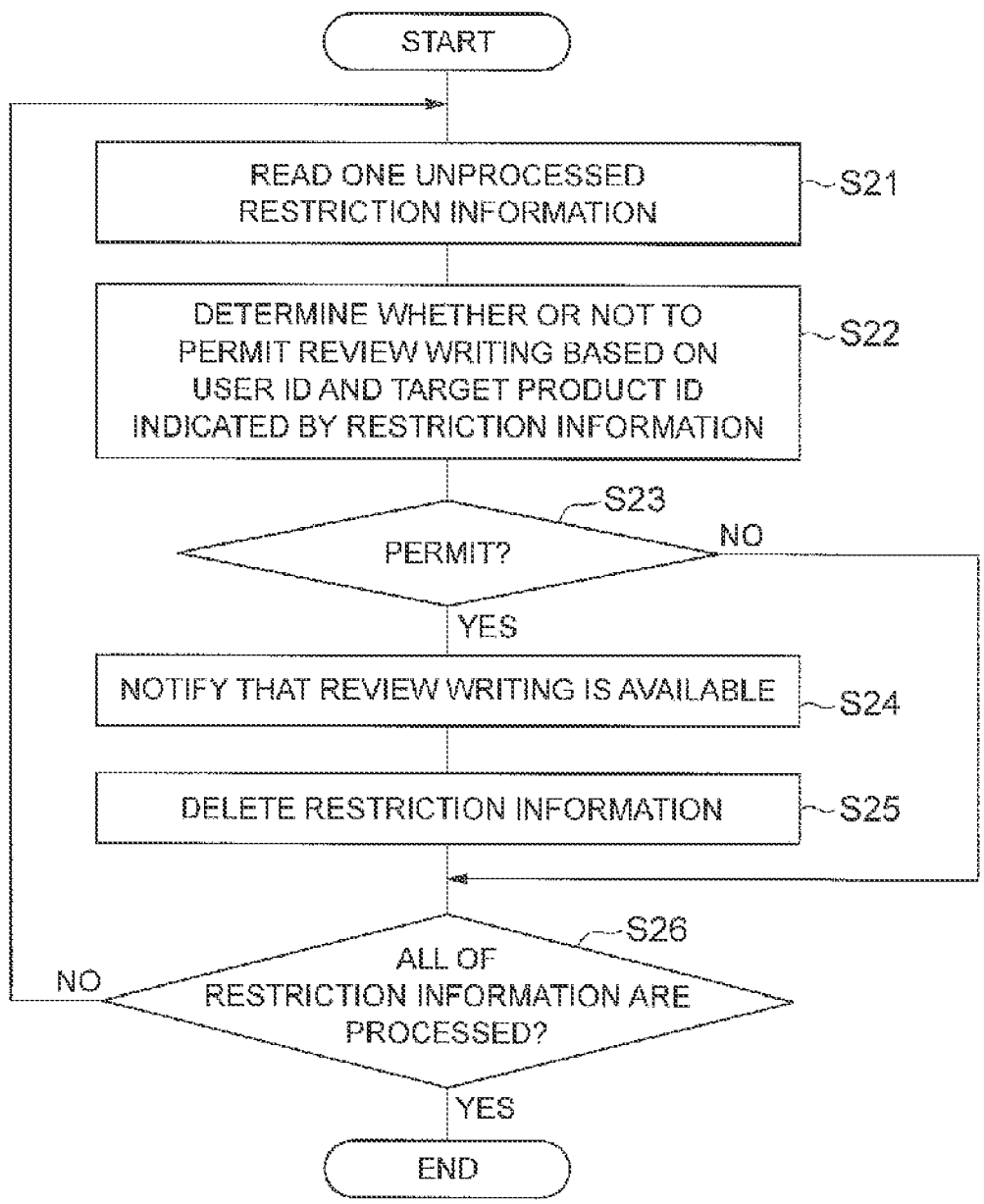
FIG. 25 is a flowchart showing an operation of a notification unit.

The processing of the notification unit 15 is as shown in FIG. 25. Specifically, the notification unit 15 reads one piece of unprocessed restriction information (Step S21) and determines whether or not to permit the writing of a review based on the user ID and the target product ID indicated by the restriction information (Step S22). This processing is the same as in Steps S131 to S138 described above. Then, when it is determined to permit the writing (YES in Step S23), the notification unit 15 notifies the user that the review writing is available (Step S24) and deletes the read restriction information from the restriction list 24 (Step S25). On the other hand, when it is determined to prohibit the writing (NO in Step S23), the notification unit 15 ends the processing for the restriction information. The notification unit 15 performs the processing of Steps S21 to S25 for all of the restriction information (cf. Step S26). The notification unit 15 performs the above process at regular intervals.

Figure 26:
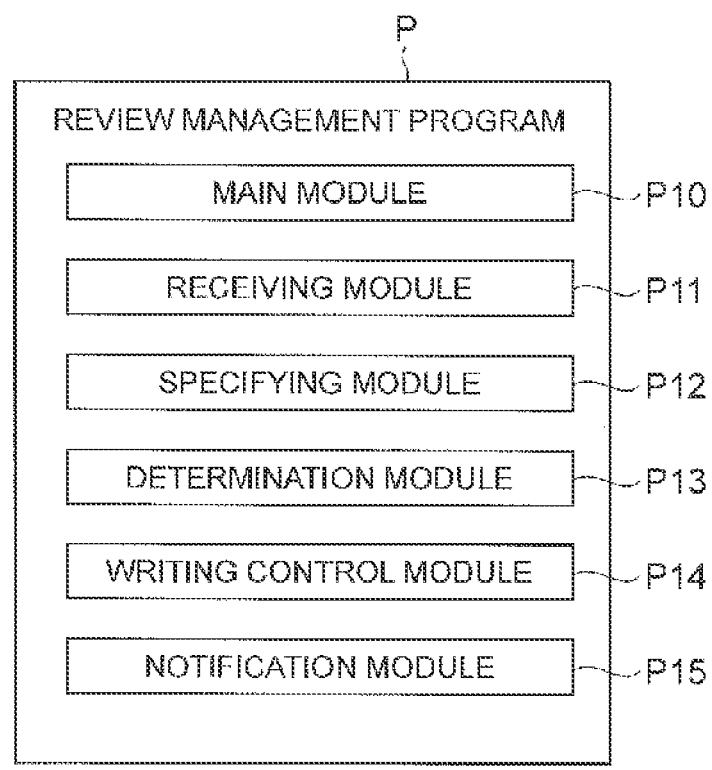
FIG. 26 is a view showing a configuration of a review management program according to the embodiment.

A review management program P that causes a computer to function as the review management device 10 is described hereinafter with reference to FIG. 26.

The review management program P includes a main module P10, a receiving module P11, a specifying module P12, a determination module P13, a writing control module P14, and a notification module P15.

The main module P10 is a part that exercises control over the review management. The functions implemented by executing the receiving module P11, the specifying module P12, the determination module P13, the writing control module P14 and the notification module P15 are equal to the functions of the receiving unit 11, the specifying unit 12, the determination unit 13, the writing control unit 14 and the notification unit 15 described above, respectively.

The review management program P is provided in the form of being recorded in a static manner on a tangible recording medium such as CD-ROM or DVD-ROM or semiconductor memory, for example. Further, the review management program may be provided as a data signal superimposed onto a carrier wave through a communication network.

As described above, according to this embodiment, whether the access user who intends to write a review of a purchased product has actually received the product is determined based on the record of the delivery status, and the writing of a review is permitted only after it is determined that the purchase product has been received. In this manner, by permitting the writing of a review only for the user who has received the purchased product, the probability that the user writes comments after actually using the product increases, and it is thereby possible to further enhance the reliability of product reviews.

In the case of facility reservation, because the time to end the use of the facility is fixed at the time of reservation, the writing of a review can be restricted until that time. However, in the case of a product, the date or time to receive the product is not fixed at the time of order. Thus, in this embodiment, focusing attention on that the current status of the product can be estimated from the delivery status, reference is made to the delivery status in order to restrict the writing of a review.

An embodiment of the present invention is described in detail above. However, the present invention is not limited to the above-described embodiment. Various changes and modifications may be made to the present invention without departing from the scope of the invention.

Although the review management system 1 permits the writing of a review on the target product at the point of time when the access user receives the target product or the related product in the above-described embodiment, the timing to permit the writing is not limited thereto.

Figure 27:
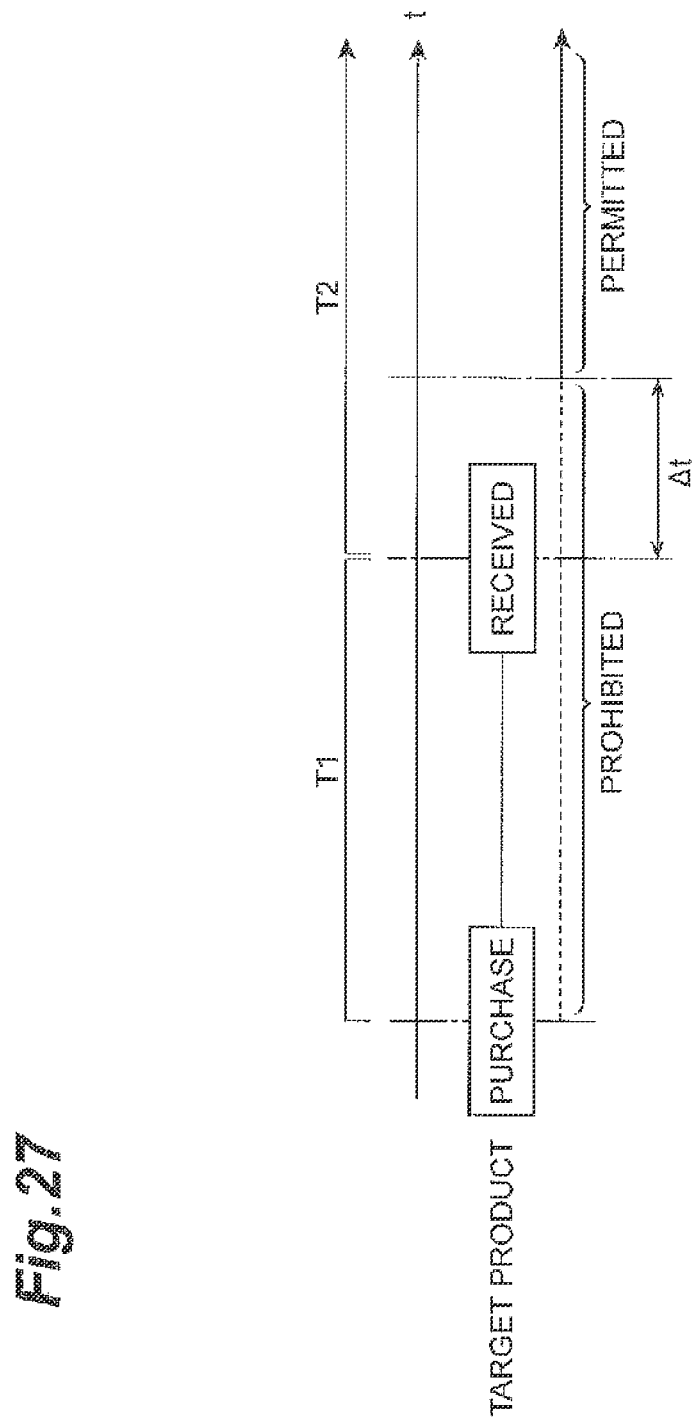
FIG. 27 is a view showing an example of writing restriction according to an alternative example.

The determination unit 13 and the writing control unit 14 may permit the writing when a specified period of time Δt has elapsed after the access user received the target product or the related product. This is applicable to any of the examples shown in FIGS. 13 to 22. An example of applying this modification is shown in FIGS. 27 and 28.

The reason for setting the time Δt is to prompt a user to write a review of a purchased product after using it, assuming that the access user actually uses the purchased product, not just receiving it.

The way of setting the time Δt is arbitrary. For example, the same value may be set as Δt for all products, or Δt may be different for each product category or each product. For example, Δt may be set to 0 to 1 day for everyday items, consumable goods, furniture and home appliances with installation services, and Δt may be set to 2 to 5 days for ready-to-assemble furniture, golf clubs, books and the like. Alternatively, Δt may be set to permit the writing on the first weekend after receiving the product.

In the case of using the time Δt, the review management system 1 may impose different restrictions on the writing in the following several steps:

Step ST1, which is before the access user receives the target product

Step ST2, which is after the access user receives the target product and before the access user is expected to use the product Step ST3, which is after the time Δt has elapsed and the access user is expected to use the target product To be more specific, the determination unit 13 performs determination as to whether the access user has received the target product and determination as to whether a specified period of time has elapsed after the access user received the target product. Then, when the access user is in the step ST2, the writing control unit 14 eases the restriction on the writing than when the access user is in the step ST1. Further, when the access user is in the step ST3, the writing control unit 14 eases the restriction on the writing than when the access user is in the step ST2. For example, the writing control unit 14 prohibits the writing for all of review input fields in the step ST1, permits the writing only for some of review input fields in the step ST2, and permits the writing for all of review input fields in the step ST3.

The functions of the notification unit 15 may be omitted. In this case, there is no need to prepare the restriction list 24, and the writing control unit 14 does not need to store the restriction information into the restriction list 24.

In the mechanism where the delivery information in the delivery database 22 is deleted at the completion of delivery, the determination unit 13 may determine whether the user has received the product based on the presence or absence of the delivery information in the delivery database 22. To be specific, when the delivery information corresponding to the product exists, the determination unit 13 determines that the user has not received the product, and when such delivery information does not exist, the determination unit 13 determines that the user has received the product.

Although the writing control unit 14 prohibits the writing that does not satisfy the conditions for permission in the above-described embodiment, the writing control unit 14 may restrict the writing by another method. For example, the writing control unit 14 may perform the restriction processing that permits the writing of a draft but prohibits the final registration for publishing it to other users.

The review management device 10 may set the "Write a Review" button in the access user's purchase history page (see FIG. 2) in accordance with the status of receiving each product. In this case, the review management device 10 displays or enables (to the state where the button can be pressed) the "Write a Review" button for the product that has been received by the access user, and does not display or disables (to the state where the button cannot be pressed) the "Write a Review" button for the product that has not been received by the user.

To be more specific, the receiving unit 11 receives a request for the purchase history page from the user terminal T. Next, the specifying unit 12 acquires ID of the access user from the request, and by referring to the purchase database 21 based on the user ID, specifies the purchased product of the access user as the target product. Then, the determination unit 13 determines the delivery status (received status) of each target product in the same manner as in the above-described embodiment. After that, the writing control unit 14 sets the "Write a Review" button of each product on the purchase history page based on the determination result. Specifically, the writing control unit 14 displays or enables the button of the product that is determined to be received by the user, and does not display or disables the button of the product that is determined not to be received by the user. The writing control unit 14 then transmits the purchase history page to the user terminal T.

The determination unit 13 may estimate the received date and time based on delivery time information in which the place of shipping the product, the place of receiving the product, and the estimated delivery period are associated, rather than referring to the received date and time of the delivery information. For example, the delivery time information is information in which the place of shipping "Kanto region", the place of receiving "Tohoku region", and the estimated delivery period "one day" are associated. In this case, the determination unit 13 reads the estimated delivery information corresponding to the store and the user from a specified database and estimates the received date and time from the order date and time and the estimated delivery period of the target product. The operation after estimating the received date and time is the same as that in the above-described embodiment. In this manner, it is possible to control the writing of a review without using the delivery information.

REFERENCE SIGNS LIST

1 . . . review management system, 10 . . . review management device, 11 . . . receiving unit, 12 . . . specifying unit, 13 . . . determination unit, 14 . . . writing control unit, 15 . . . notification unit, 20 . . . databases, 21 . . . purchase database, 22 . . . delivery database, 23 . . . set product database, 24 . . . restriction list, P . . . review management program, P10 . . . main module, P11 . . . receiving module, P12 . . . specifying module, P13 . . . determination module, P14 . . . writing control module, P15 . . . notification module

The invention claimed is:

1. A review management device comprising:
at least one memory operable to store instructions; and
at least one processor operable to access said at least one memory, read said instructions, and operate according to said instructions, said instructions comprising:
receiving instructions configured to cause at least one of said at least one processor to receive a request for a review writing page from a user terminal displaying a purchase history page of an access user;

specifying instructions configured to cause at least one of said at least one processor to specify the access user and a target product for a product review based on the request;

determination instructions configured to cause at least one of said at least one processor to acquire a delivery status of products purchased by users on a web site and determine whether the access user has received the target product purchased on the web site;

writing control instructions configured to cause at least one of said at least one processor to:
- based on a determination that the access user has received the target product, transmit the review writing page comprising a plurality of input fields to the user terminal to be displayed on a display of the user terminal and permit writing of a review on the target product by the access user for one or more of the plurality of input fields in the review writing page, and
- based on a determination that the access user has not received the target product, restrict the writing of the review on the target product via the review writing page by the access user, generate restriction information in which the access user and the target product are associated, and store the generated restriction information into a storage;

notification instructions configured to cause at least one of said at least one processor to:
- read the restriction information stored in the storage;
- perform the same processing as the determination instructions with respect to the access user and the target product indicated by the restriction information stored in the storage;
- when permitting the writing of the review on the target product previously restricted by the writing control instructions, embed in the purchase history page of the access user a message indicating the access user of a permission of the writing of the review; and
- delete the restriction information stored from the storage, and store instructions configured to cause at least one of said at least one processor to store, in a set product database, set product information indicating a plurality of predefined combinations, each indicating a combination of a plurality of kinds of products that are likely to be purchased and used together, wherein the determination instructions are further configured to cause at least one of said at least one processor to acquire set product information including the target product by referring to the set product database, specify a first related product purchased by the access user concurrently with or after a time point of purchasing the target product and combined with the target product in the set product information by referring to the set product database, and determine whether the access user has received both the target product and the first related product based on the delivery status of the products purchased by the access user, and the writing control instructions are further configured to cause at least one of said at least one processor to, in response to specifying the first related product, permit the writing of the review on the target product and not on the first related product, only when it is determined that the access user has received both the target product and the first related product, and restrict the writing of the review on the target product and not on the first related product, when it is determined that the access user has received the target product but has not received the first related product.

2. The review management device according to claim 1, wherein
when the first related product purchased concurrently with or after the time point of purchasing the target product does not exist, the determination instructions cause at least one of said at least one processor to determine whether the access user has received the target product, and
the writing control instructions cause at least one of said at least one processor to permit the writing after it is determined that the access user has received the target product, and restrict the writing when it is determined that the access user has not received the target product.

3. The review management device according to claim 1, wherein
the determination instructions are further configured to cause at least one of said at least one processor to determine whether the access user has purchased and received the target product in the past before the access user has purchased the target product last time, and
when it is determined that the access user has received the target product in the past, the writing control instructions cause at least one of said at least one processor to permit the writing regardless of whether the access user has received the target product.

4. The review management device according to claim 1, wherein
the determination instructions are further configured to cause at least one of said at least one processor to determine whether a specified period of time has elapsed after the access user has received both of the target product and the first related product, and permit the writing when it is determined that the specified period of time has elapsed, and restrict the writing when it is determined that the specified period of time has not elapsed.

5. The review management device according to claim 1, wherein
the determination instructions are further configured to cause at least one of said at least one processor to estimate the delivery status based on information in which a place of shipping and a place of receiving a product and an estimated delivery period are associated.

6. A review management method performed by at least one computer processor, comprising:
receiving a request for a review writing page from a user terminal displaying a purchase history page of an access user;

specifying the access user and a target product for a product review based on the request;

acquiring a delivery status of products purchased by users on a web site and performing determining operation which determines whether the access user has received the target product purchased on the web site;

based on a determination that the access user has received the target product, transmitting the review writing page comprising a plurality of input fields to the user terminal to be displayed on a display of the user terminal and permitting writing of a review on the target product by the access user for one or more of the plurality of input fields in the review writing page;

based on a determination that the access user has not received the target product, restricting the writing of the review on the target product via the review writing page by the access user, generating restriction information in which the access user and the target product are associated, and storing the generated restriction information into a storage;

reading the restriction information stored in the storage;

performing the same processing as the determining operation with respect to the access user and the target product indicated by the restriction information stored in the storage;

when permitting the writing of the review previously restricted, embedding in the purchase history page of the access user a message indicating the access user of a permission of the writing of the review; and deleting the restriction information stored from the storage, the method further comprising:

storing, in a set product database, set product information indicating a plurality of predefined combinations, each indicating a combination of a plurality of kinds of products that are likely to be purchased and used together, acquiring set product information including the target product by referring to the set product database, specifying a first related product purchased by the access user concurrently or after a time point of purchasing with the target product and combined with the target product in the set product information by referring to the set product database, and determining whether the access user has received both the target product and the first related product based on the delivery status of the products purchased by the access user, and in response to specifying the first related product, permitting the writing of the review on the target product and not on the first related product, only when it is determined that the access user has received both the target product and the first related product, and restricting the writing of the review on the target product and not on the first related product, when it is determined that the access user has received the target product but has not received the first related product.

7. A non-transitory computer readable medium storing a review management program causing a computer to:

receive a request for a review writing page from a user terminal displaying a purchase history page of an access user;

specify the access user and a target product for a product review based on the request;

acquire a delivery status of products purchased by users on a web site and perform determining operation which determines whether the access user has received the target product purchased on the web site;

based on a determination that the access user has received the target product, transmit the review writing page comprising a plurality of input fields to the user terminal to be displayed on a display of the user terminal and permit writing of a review on the target product by the access user for one or more of the plurality of input fields in the review writing page;

based on a determination that the access user has not received the target product, restrict the writing of the review on the target product via the review writing page by the access user, generate restriction information in which the access user and the target product are associated, and store the generated restriction information into a storage, read the restriction information stored in the storage;

perform the same processing as the determining operation with respect to the access user and the target product indicated by the restriction information stored in the storage;

when permitting the writing of the review previously restricted, embed in the purchase history page of the access user a message indicating the access user of a permission of the writing of the review; and delete the restriction information stored from the storage, the review management program further causing the computer to:

store, in a set product database, set product information indicating a plurality of predefined combinations, each indicating a combination of a plurality of kinds of products that are likely to be purchased and used together, wherein acquire set product information including the target product by referring to the set product database, specify a first related product purchased by the access user concurrently with or after a time point of purchasing the target product and combined with the target product in the set product information by referring to the set product database, and determine whether the access user has received both the target product and the first related product based on the delivery status of the products purchased by the access user, and in response to specifying the first related product, permit the writing of the review on the target product and not on the first related product, only when it is determined that the access user has received both the target product and the first related product, and restrict the writing of the review on the target product and not on the first related product, when it is determined that the access user has received the target product but has not received the first related product.

8. The review management device according to claim 1, wherein the determination instructions are further configured to cause at least one of said at least one processor to determine whether a specified period of time has elapsed after the access user has received the target product, and when it is determined that the access user has received the target product but the specified period of time has not elapsed after the access user has received the target product, the writing control instructions cause at least one of said at least one processor to transmit the review writing page comprising the plurality of input fields to the user terminal to be displayed on the display of the user terminal, permit the writing of the review on the target product for only some of the plurality of input fields, and restrict the writing of the review on the target product for remaining input fields of the plurality of input fields, and when it is determined that the specified period of time has elapsed after the access user has received the target product, the writing control instructions cause at least one of said at least one processor to permit the writing of the review on the target product for all of the plurality of input fields of the review writing page.

9. The review management device according to claim 1, wherein, when a second related product is purchased by the user after a purchase of the first related product while the user has not yet received both the target product and the first related product, the second related product being combined with the target product and the first related product in the set product information stored in the set product database, the writing control instructions are further configured to cause at least one of said at least one processor to restrict the writing of the review on the target product, the review on the target product and not on the first related product and the second related product, until it is determined that the access user has received all of the target product, the first related product, and the second related product.

* * * * *